United States Patent
Chopra et al.

(10) Patent No.: US 12,271,504 B2
(45) Date of Patent: Apr. 8, 2025

(54) METHOD AND SYSTEM FOR IDENTIFYING PRODUCT FEATURES BASED ON METADATA

(71) Applicant: Dell Products L.P., Round Rock, TX (US)

(72) Inventors: Shelesh Chopra, Bangalore (IN); Gururaj Kulkarni, Bangalore (IN); Mahantesh Ambaljeri, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 271 days.

(21) Appl. No.: 18/157,242

(22) Filed: Jan. 20, 2023

(65) Prior Publication Data

US 2024/0249017 A1 Jul. 25, 2024

(51) Int. Cl.
*G06F 21/62* (2013.01)
*G06F 9/455* (2018.01)
*G06F 16/2457* (2019.01)
*G06F 16/25* (2019.01)

(52) U.S. Cl.
CPC ...... *G06F 21/6245* (2013.01); *G06F 9/45558* (2013.01); *G06F 16/24578* (2019.01); *G06F 16/254* (2019.01); *G06F 21/6218* (2013.01); *G06F 2009/45587* (2013.01)

(58) Field of Classification Search
CPC ............. G06F 21/6245; G06F 9/45558; G06F 21/6218; G06F 16/24578; G06F 2009/45587
See application file for complete search history.

(56) References Cited

U.S. PATENT DOCUMENTS

| | | | |
|---|---|---|---|
| 11,799,963 B1* | 10/2023 | Chopra | G06F 9/45558 |
| 2006/0004699 A1* | 1/2006 | Lehikoinen | G06F 16/48 |
| 2007/0021967 A1* | 1/2007 | Jaligama | G06Q 10/067 |
| | | | 705/348 |

(Continued)

FOREIGN PATENT DOCUMENTS

| | | |
|---|---|---|
| EP | 2642444 A1 | 9/2013 |
| WO | 2014134592 A1 | 9/2014 |

*Primary Examiner* — Mohammad A Siddiqi
(74) *Attorney, Agent, or Firm* — Aly Z. Dossa; Chamberlain, Hrdlicka, White, Williams & Aughtry

(57) ABSTRACT

A method for managing a data protection module includes: obtaining client metadata associated with client environment (CE) data protection modules, in which the client metadata includes first product configuration information; obtaining vendor metadata associated with a vendor environment (VE) data protection module, in which the vendor metadata includes second product configuration information; analyzing the client metadata and vendor metadata to extract relevant data; obtaining product features that are commonly utilized by at least one user of the CE data protection modules; making a first determination that a mismatch exists between the client metadata and vendor metadata; generating a ranked list of the product features that are commonly utilized; identifying a product feature that has the highest rank in the ranked list; making a second determination that the mismatch is a vendor-related mismatch; and sending a recommendation to a user of the VE data protection module to manage the mismatch.

20 Claims, 9 Drawing Sheets

(56) References Cited

U.S. PATENT DOCUMENTS

| | | | |
|---|---|---|---|
| 2007/0079117 A1* | 4/2007 | Bhogal | H04L 9/00 |
| | | | 713/160 |
| 2007/0143159 A1* | 6/2007 | Dillard | G06Q 10/06375 |
| | | | 705/7.37 |
| 2008/0201299 A1* | 8/2008 | Lehikoinen | G06F 16/48 |
| 2008/0263678 A1* | 10/2008 | Kroll | G06F 21/6218 |
| | | | 726/30 |
| 2014/0272910 A1* | 9/2014 | del Ninno | G09B 7/06 |
| | | | 434/362 |
| 2015/0178062 A1* | 6/2015 | Adderly | G06F 8/65 |
| | | | 717/170 |
| 2022/0292211 A1* | 9/2022 | Reineke | G06F 21/6218 |
| 2024/0160580 A1* | 5/2024 | Kalsi | G06F 12/109 |
| 2024/0248762 A1* | 7/2024 | Chopra | G06F 9/45558 |
| 2024/0249328 A1* | 7/2024 | Chopra | G06Q 30/0621 |
| 2024/0265138 A1* | 8/2024 | Yannuzzi | G06F 21/629 |

* cited by examiner

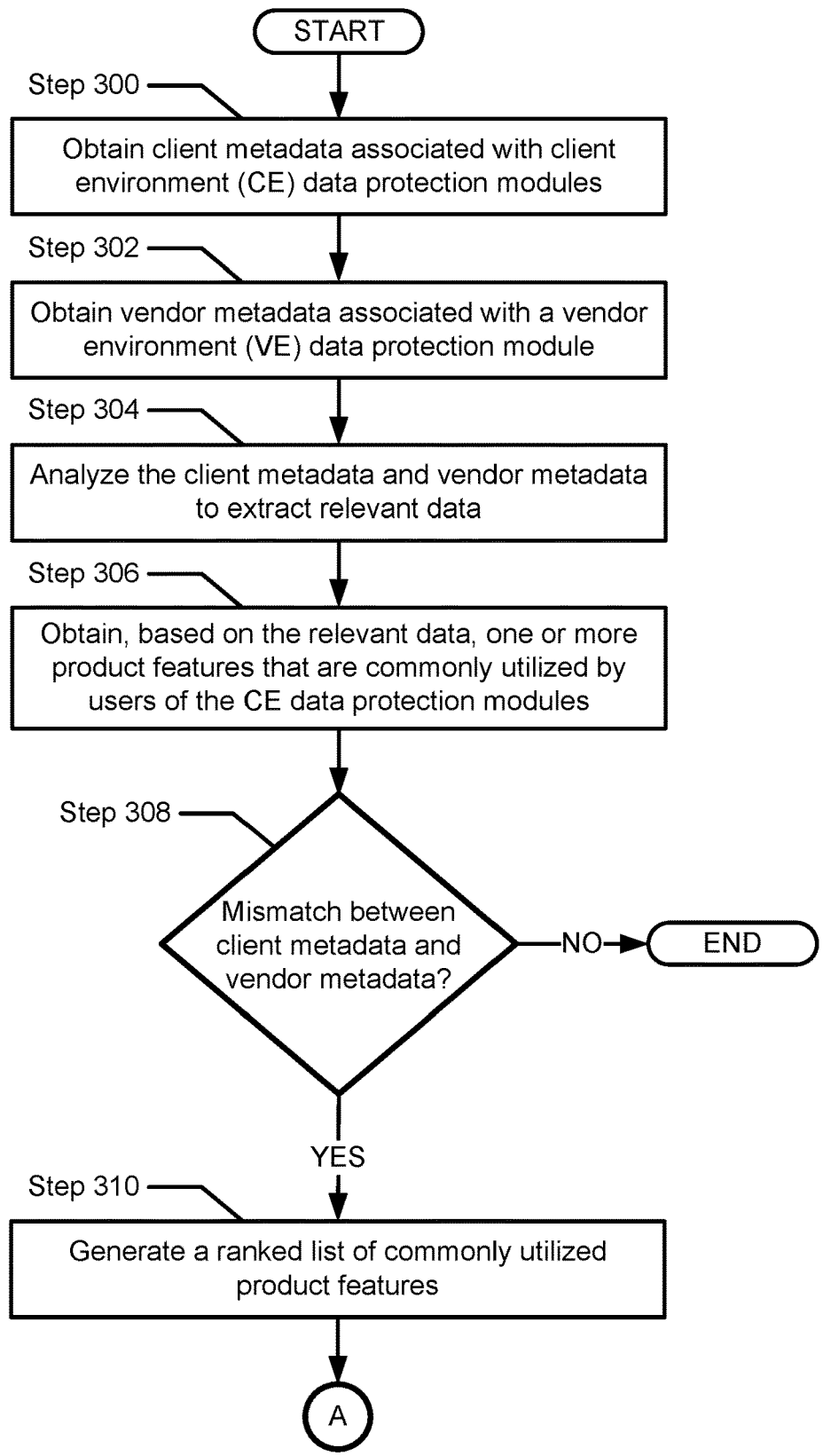
FIG. 3.1

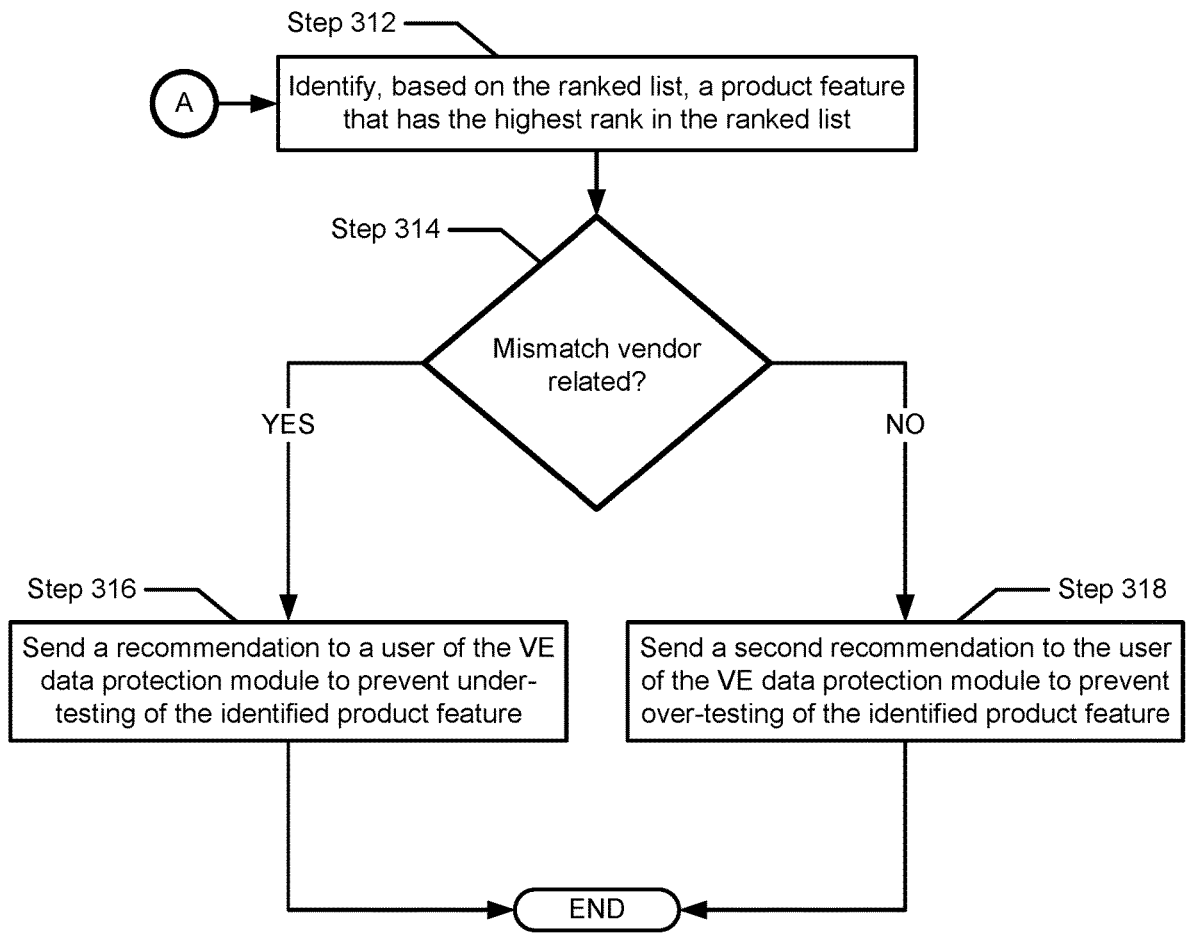
FIG. 3.2

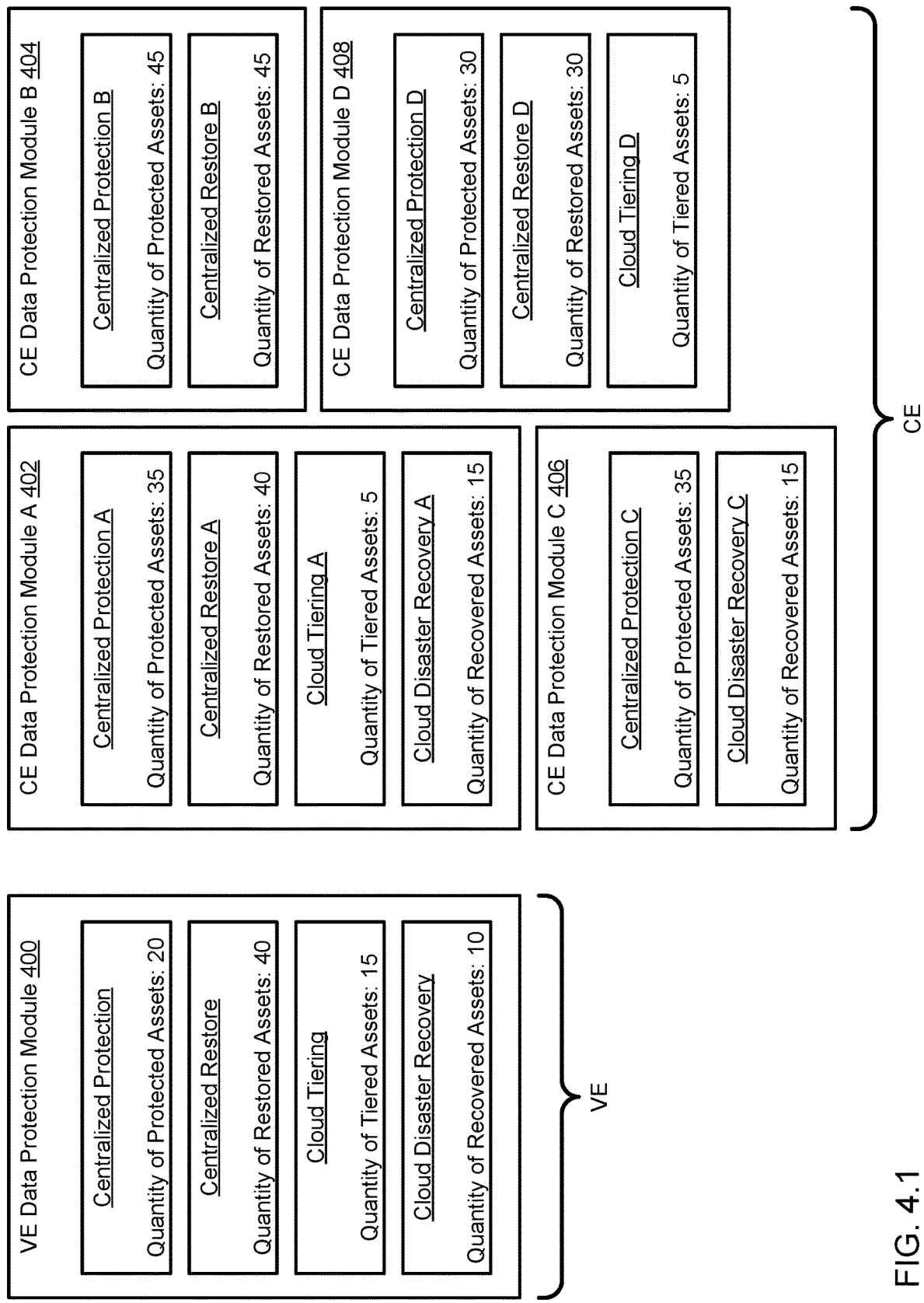
FIG. 4.1

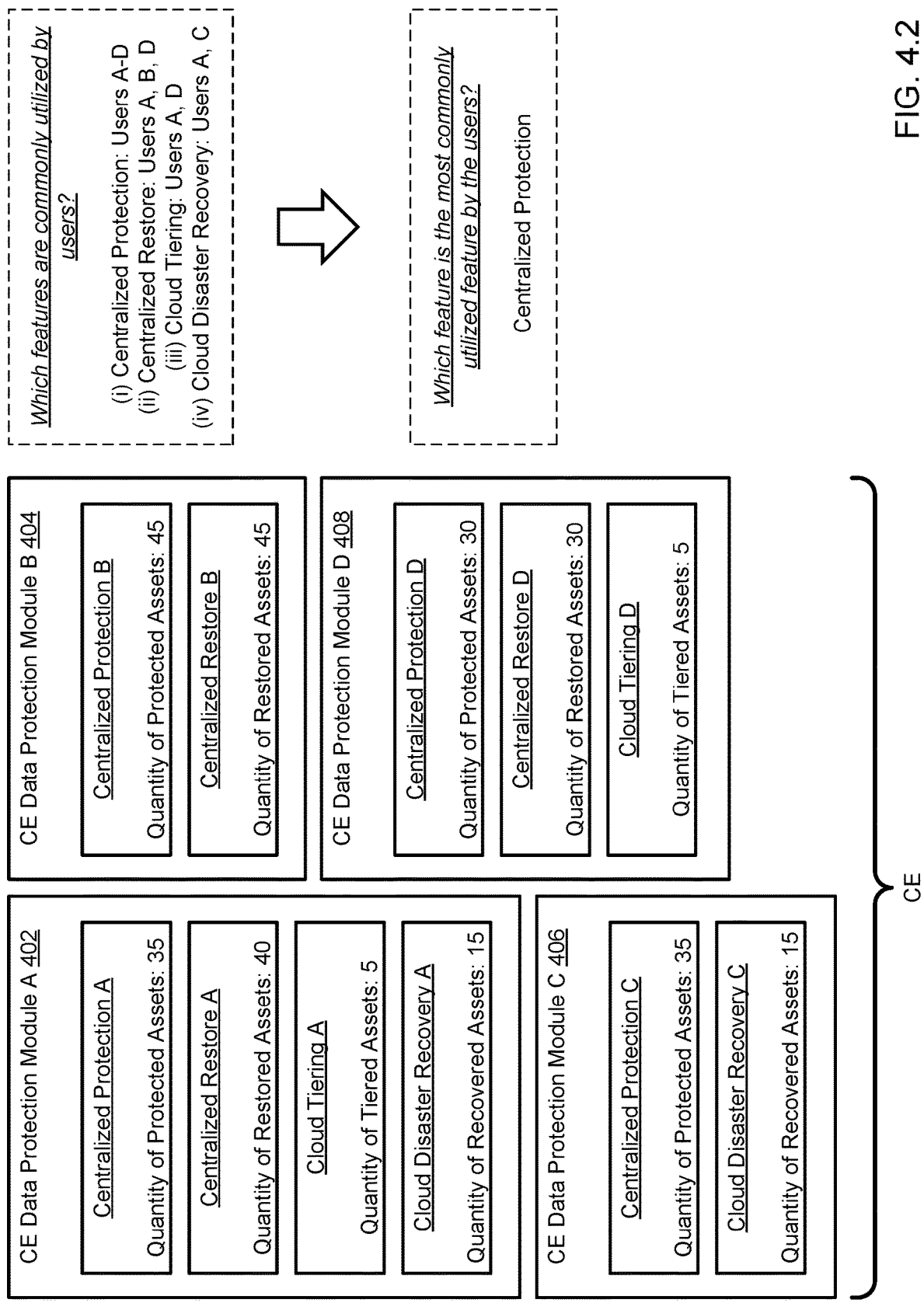
FIG. 4.2

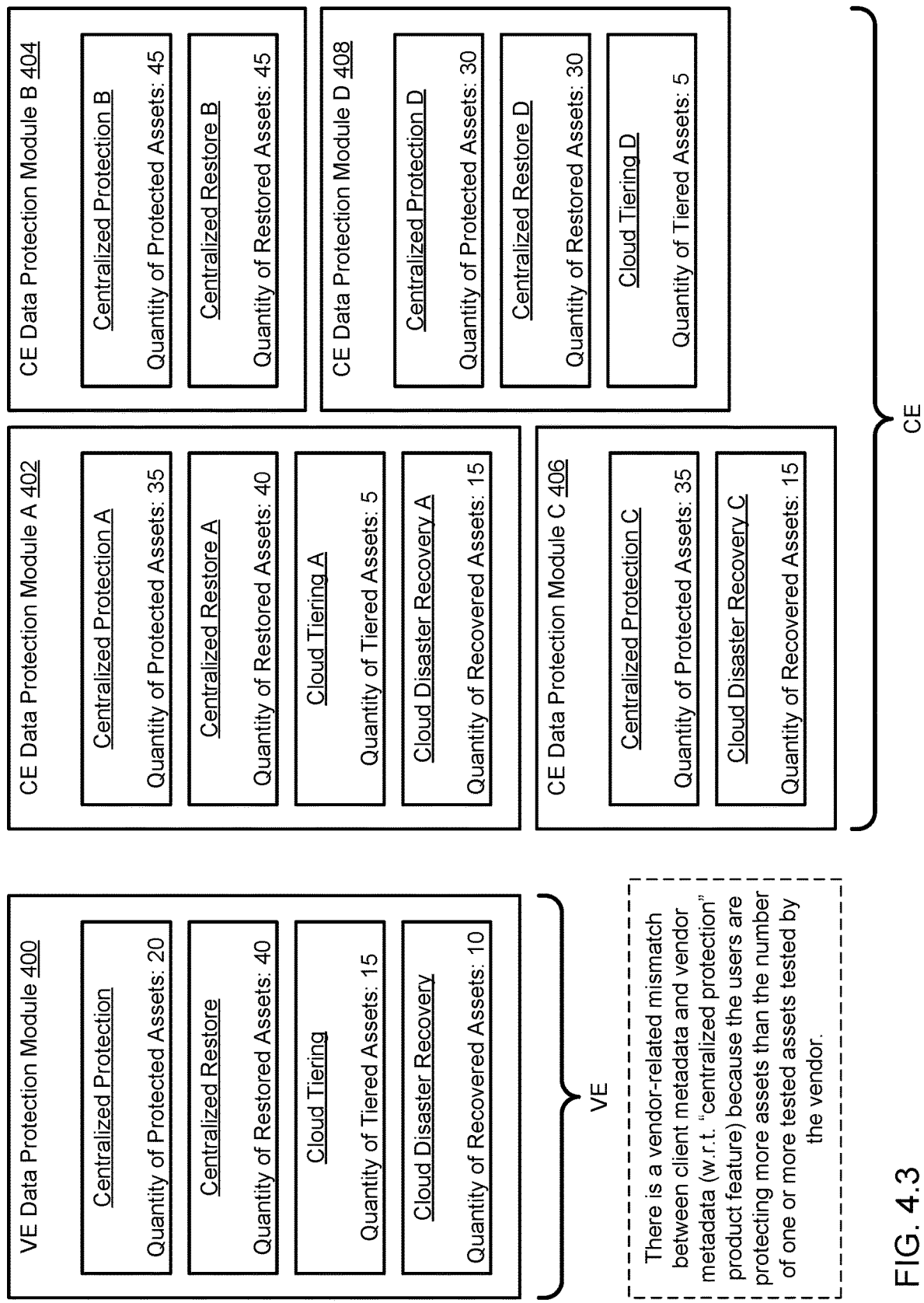
FIG. 4.3

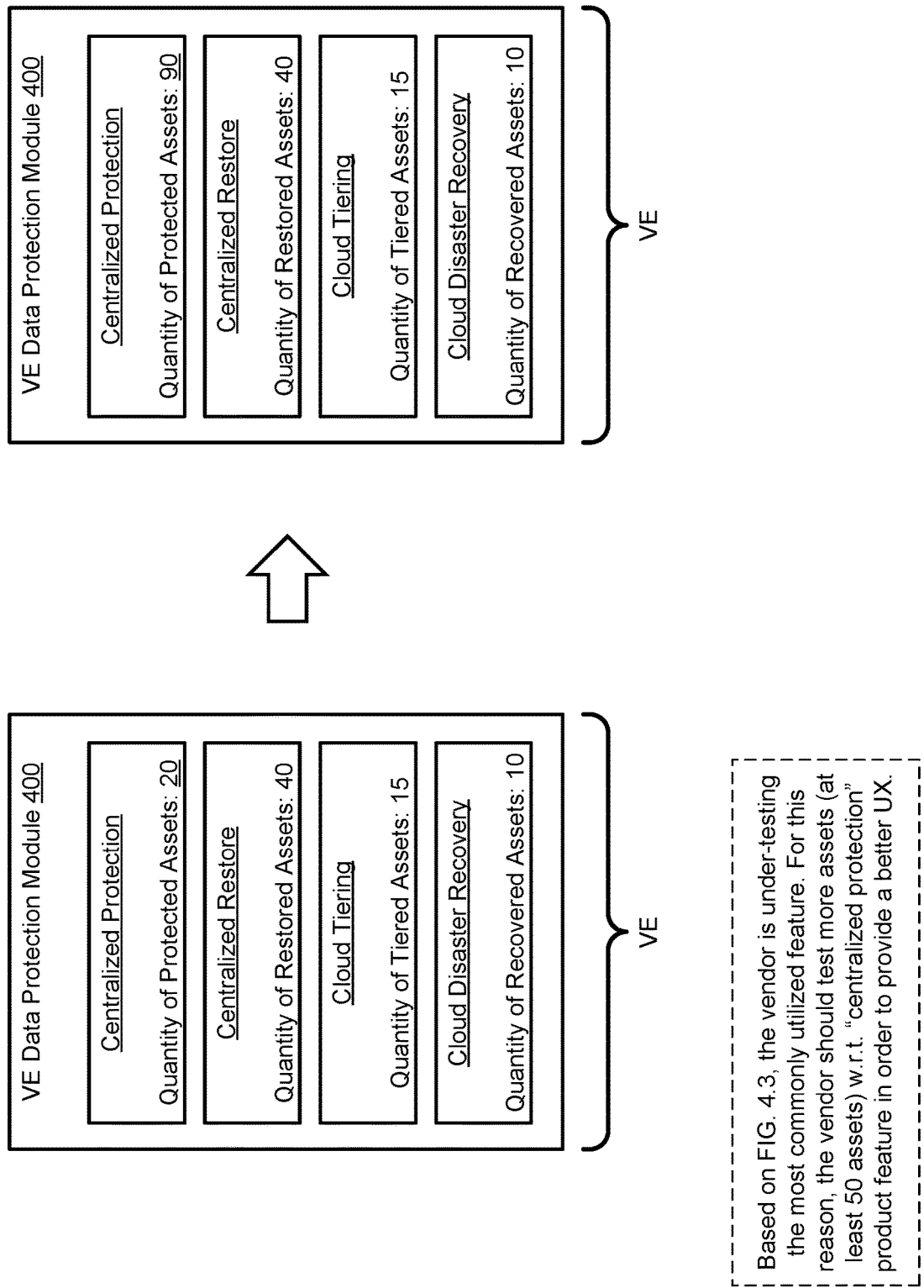
FIG. 4.4

METHOD AND SYSTEM FOR IDENTIFYING PRODUCT FEATURES BASED ON METADATA

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1 and 3.2 show a method for identifying one or more product features based on metadata in accordance with one or more embodiments of the invention.

FIGS. 4.1-4.4 show an example use case in accordance with one or more embodiments of the invention.

DETAILED DESCRIPTION

Figure 1:
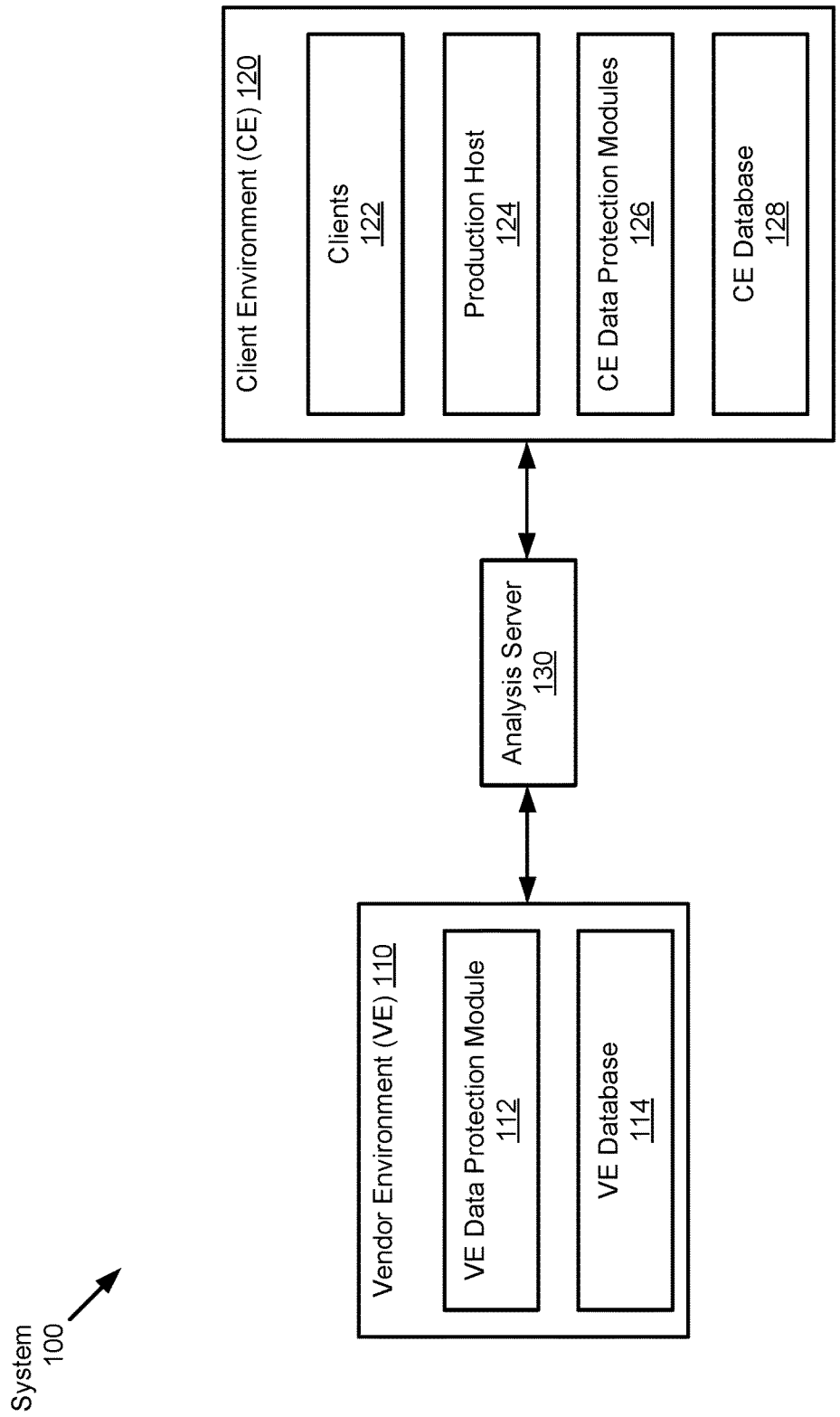
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, data (e.g., digital information) growth (and the resulting complexity) causes continuous challenges in the field of data protection. The so-called data explosion is a reality faced by a majority of large-scale organizations (or companies). One resource has estimated that the total volume of datasphere (where data is being generated) is expected to grow by 175 zettabytes (175ZB) by 2025. In most cases, the datasphere may be thought of as having the following three locations: (i) "core" locations, which include at least traditional and cloud data centers, (ii) "Edge" locations, which include at least remote and branch offices, and (iii) "endpoint" locations, which include at least personal computers, smartphones, and Internet of Things (IoT) devices. Day-by-day, the data (e.g., workloads, mission critical data of those workloads, etc.) continues to spread across all these locations. In response, Information Technology (IT) data centers are adopting various different technologies to handle the data, such as, for example, public, private, and hybrid cloud technologies. There may be various types of, for example, workloads that need to be protected by data protection software (e.g., software capabilities provided by a data protection module) and these workloads may be spread across all these locations.

Data protection vendors are spending significant time and energy (i) to manage these massive amounts of data and (ii) to obtain useful insights (e.g., data protection policies implemented by a user (e.g., a customer), types of workloads protected by those policies, etc.) from one or more data protection modules (e.g., devices, tools, etc.) (for example, from the ones that are deployed to users) in order to internally manage differences (e.g., workload-related differences, scalability-related differences, etc.) between how the vendors are testing different aspects (e.g., reliability, scalability, user-friendliness, etc.) of the modules and how the users are utilizing the modules.

To be able to get useful and detailed insights from the data protection modules (simply "the products") that are deployed to the users, administrators (e.g., vendors) of those products rely on telemetry data, in particular, metadata (e.g., types of workloads utilized by the users, service level objectives (SLOs) set by the users, etc.) associated with today's modern applications that are being executed on those products. As discussed below, metadata is not only helpful to extract more useful and detailed insights about, for example, a user environment (e.g., a client environment) and the utilization of a deployed product, but is also helpful (i) to manage differences between vendors' product testing activities and users' product utilization activities for product management and development, and (ii) to manage users' future data growth challenges. In most cases, because of the size (or amount) of metadata being obtained (or received) from the products provided to the users, administrators of those products invest most of their time and engineering efforts to refine the metadata; however, the administrators still struggle to extract useful and detailed insights from the metadata.

For at least the reasons discussed above, without requiring resource (e.g., time, engineering, etc.) intensive efforts (i) to extract useful and detailed insights from metadata, (ii) to identify a user profile of a user based on the extracted insights, (iii) to identify product feature utilization patterns of one or more product features based on the extracted insights, and (iv) to take one or more preventive (and proactive) actions based on the product feature utilization patterns, a fundamentally different approach (e.g., an "eat your own dog food" approach that also requires obtaining metadata from a product deployed to a vendor environment for testing and product development) is needed. Embodiments of the invention relate to methods and systems (i) to extract useful and detailed insights from metadata (including metadata obtained from a client environment and a vendor environment), (ii) based on (i), to identify a user profile of a user, (iii) based on (i), to identify product feature utilization patterns, and (iv) based on (iii), to take one or more preventive (and proactive) actions. More specifically, the embodiments of the invention may first obtain client metadata of one or more client environment data protection modules, in which the client metadata includes at least first product configuration information. Vendor metadata of a vendor environment data protection module may then be obtained, in which the vendor metadata includes at least second product configuration information. Thereafter, the client metadata and vendor metadata may be analyzed to extract relevant data. Based on the relevant data, one or more product features that are commonly utilized by at least one user of the client environment data protection modules may be obtained. Based on the relevant data, a first determination may be made that a mismatch exists between the client metadata and vendor metadata.

Further, in response to the first determination, a ranked list of the product features that are commonly utilized may be generated. Based on the ranked list, a product feature that has the highest rank in the ranked list may be identified. Thereafter, based on the first determination, a second determination may be made that the mismatch is a vendor-related mismatch. Finally, based on the second determination, a recommendation may be sent to an administrator (e.g., a user, a developer, etc.) of the vendor environment data protection module to manage the vendor-related mismatch. As a result of the processes discussed below, one or more embodiments disclosed herein advantageously ensure that: (i) administrators not need to invest most of their time and engineering efforts to refine metadata, (ii) administrators manage users' future data growth challenges more effectively, (iii) administrators extract useful and detailed insights from metadata without the requirement of resource-intensive efforts, (iv) based on extracted insights, administrators manage differences between product testing activities and product utilization activities for more pinpoint product management and development, (v) based on extracted insights, administrators adopt a "shift-left" testing methodology in product management and development, (vi) based on extracted insights, administrators identify a user profile and a product feature utilization pattern of a user more in-depth in order to provide a better user experience to the user, and (vii) based on extracted insights, administrators invest most of their time and engineering effort to make correct decisions with respect to product investment opportunities (rather than second-guessing).

The following describes various embodiments of the invention.

FIG. 1 shows a diagram of a system (100) in accordance with one or more embodiments of the invention. The system (100) includes any number of clients (122), any number of production hosts (e.g., 124), any number of client environment (CE) data protection modules (126), a CE database (128), an analysis server (130), a vendor environment (VE) data protection module (112), and a VE database (114). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (122), the production host (124), the CE data protection modules (126), the analysis server (130), the VE data protection module (112), the CE database (128), and the VE database (114) may be physical or logical devices, as discussed below. In one or more embodiments, the clients (122), the production host (124), the CE data protection modules (126), and the CE database (128) may collectively be referred to as "components of a CE (120)". Similarly, in one or more embodiments, the VE data protection module (112) and the VE database (114) may collectively be referred to as "components of a VE (110)".

While FIG. 1 shows a specific configuration of the system (100), other configurations may be used without departing from the scope of the invention. For example, although the CE (120) and the analysis server (130) are shown to be directly connected, the CE (120) and the analysis server (130) may be operatively connected through a communication network (not shown). As yet another example, although the VE (110) and the analysis server (130) are shown to be directly connected, the VE (110) and the analysis server (130) may be operatively connected through the communication network.

Further, the functioning of the CE data protection modules (126) and the VE data protection module (112) is not dependent upon the functioning and/or existence of the other components (e.g., devices) in the system (100). Rather, the CE data protection modules (126) and the VE data protection module (112) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (122). The system (100) may also represent a comprehensive middleware layer executing on computing devices (e.g., 500, FIG. 5) that supports virtualized application environments. In one or more embodiments, the system (100) may support one or more virtual machine (VM) environments (e.g., the production host (124)), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being implemented as a physical computing device or a logical computing device, a CE data protection system (not shown, but includes at least the CE data protection modules (126) and the CE database (128)) may include functionality to, e.g.: (i) provide software-defined data protection, (ii) provide automated data discovery, protection, management, and recovery operations in on-premises, (iii) provide data deduplication, (iv) orchestrate data protection (e.g., centralized data protection, self-service data protection, etc.) through one or more graphical user interfaces (GUIs) of the CE data protection modules (126), (v) empower data owners (e.g., users of the clients (122)) to perform self-service data backup and restore operations from their native applications, (vi) ensure compliance and satisfy different types of SLOs, (vii) enable virtualized and cloud deployments, including automated data discovery, protection, management, and recovery operations for in-cloud workloads, (viii) enable data discovery, protection, management, and recovery operations for cloud-native workloads (e.g., an application that was designed to reside in a cloud environment) across multiple cloud environments, (ix) simplify VM image backups of a VM with near-zero impact on the VM, (x) streamline data protection for applications and/or containers (e.g., Kubernetes® containers), (xi) increase resiliency of an organization by enabling rapid recovery or cloud disaster recovery from cyber incidents, (xii) provide long-term data retention, (xiii) provide dynamic network-attached storage (NAS) backup and recovery, and (xiv) provide operational simplicity, agility, and flexibility for physical, virtual, and cloud-native IT environments. One of ordinary skill will appreciate that the CE data protection system may perform other functionalities without departing from the scope of the invention.

In one or more embodiments, a GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, "data retention" is a period of time, with a definite start and end, within which the data should be retained in storage (e.g., storage of the CE (120) or simply "CE storage"). For example, a set of user requirements and/or technical considerations (e.g., security considerations, performance considerations, etc.) of a data center may be used to generate a data retention policy specifying that user data should be retained in the storage for six years.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, a "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window (discussed below).

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments in connection with which embodiments of the invention may be employed include (but not limited to): Microsoft® Azure, Amazon® AWS, Dell® Cloud Storage Services, Google® Cloud, etc.

In one or more embodiments, as described above, the CE data protection system (not shown) may include the CE data protection modules (126) and the CE database (128).

In one or more embodiments, the CE data protection modules (126) may provide data protection (e.g., data backup, data management, data restore, etc.) services to the production host (124) (or any other component of the system (100)). The data protection services may initiate (e.g., instantiate, execute, etc.) generation and storage of backups (e.g., block-based backups, file-based backups, etc.) in the CE storage. The data protection services may also include restoration of the production host (124) (or any other component of the system (100)) to a restoration host (not shown) using the backups stored (temporarily or permanently) in the CE storage.

More specifically, the CE data protection modules (126) may provide data protection services to the production host (124) (or any other component of the system (100)) by orchestrating (or scheduling): (i) generation of backups of the production host (124), (ii) storage of the generated backups of the production host (124) in the CE storage, (iii) consolidation of one or more backup requests to reduce (or to prevent) generation of backups that are not useful for restoration purposes, and (iv) restoration of the production host (124) to previous states using backups stored in the CE storage.

Further, to provide the aforementioned services, the CE data protection modules (126) may include functionality to generate and issue instructions to any other component of the system (100). The CE data protection modules (126) may also generate instructions in response to data protection requests from other entities.

In one or more embodiments, the CE data protection modules (126) may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, the CE data protection modules (126) may provide one or more computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients (122)).

In one or more embodiments, while performing one or more operations requested by a user (or an administrator) of the clients (122), the CE data protection modules (126) may include functionality to request and use resources (e.g., data, computing resources, etc.) available in the CE data protection system. Additional details about the resources (e.g., processing resources, networking resources, etc.) are described below. In one or more embodiments, the administrator may be a user with permission to make changes on the clients (122) that will affect other users of the clients (122).

In one or more embodiments, in order to provide the above-mentioned functionalities, the CE data protection modules (126) may need to communicate with other components of the system (100) (e.g., the production host (124), the CE database (128), etc.) with minimum amount of latency (e.g., with high-throughput (e.g., a high data transfer rate) and sub-millisecond latency). For this reason, representational state transfer application programming interfaces (REST APIs) may be used to enable communication between the CE data protection modules (126) and the components. As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use Hypertext Transfer Protocol (HTTP) to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, similar to the communication between the clients (122) and the production host (124), the clients (122) may also send a request (e.g., a data protection request) to one or more of the CE data protection modules (126), and in return, the clients (122) may receive a response (e.g., a response that specifies completion of a database backup in storage) from the corresponding CE data protection module. One of ordinary skill will appreciate that the CE data protection modules (126) may perform other functionalities without departing from the scope of the invention.

In one or more embodiments, the CE data protection modules (126) may support various types of protection targets, depending on the particular use case(s) involved. Such protection targets generally refer to systems, devices, and other computing entities capable of storing data (e.g., backup data). These may be referred to as "protection targets" because they afford protection of data by storing, for example, a copy or clone of that data. In one or more embodiments, protection targets may include, for example (but not limited to): Dell® EMC Data Domain devices (including both physical and virtual devices), Flash storage, private cloud object storage (e.g., Amazon® S3).

In one or more embodiments, each of the example protection targets noted above may have different respective SLAs, performance parameters, latency, and cost. For this reason, if users have specific SLAs for data protection purposes, development of static policies that statically associate protection targets with data protection workloads requires careful evaluation to satisfy the SLA and could adversely impact the ability of satisfying these SLAs if not properly designed.

Further, for example, if a user has various different workload types with different respective SLA requirements, the user may not simply generate a data protection policy and then associate an SLA to these policies, leaving it to a CE data protection module to automatically select a protection target depending on the SLA. Rather, the protection target selection is a time and labor-intensive manual process that requires a careful designing of a backup infrastructure before assigning one or more protection targets.

Figure 5:
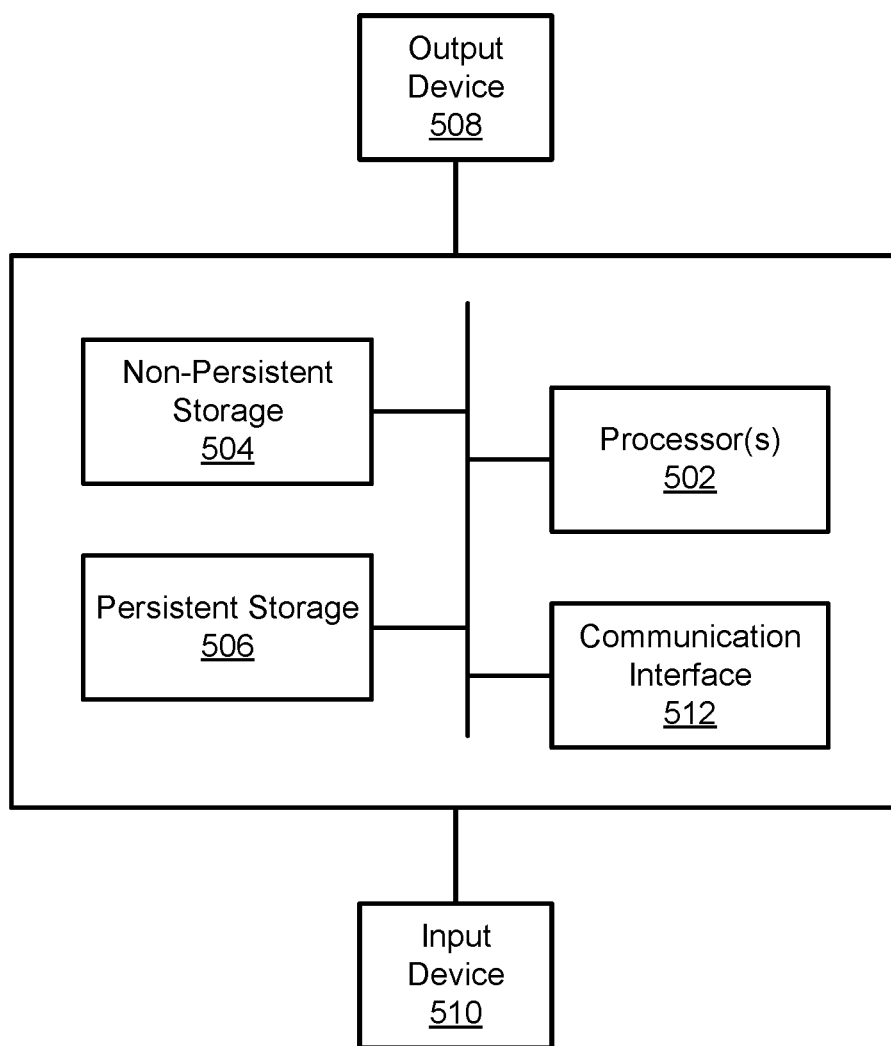
FIG. 5 shows a diagram of a computing device in accordance with one or more embodiments of the invention.

In one or more embodiments, the CE data protection modules (126) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the CE data protection modules (126) described throughout the application.

Alternatively, in one or more embodiments, the CE data protection modules (126) may be implemented as logical devices. The logical devices may utilize the computing resources of any number of computing devices to provide the functionality of the CE data protection modules (126) described throughout the application.

In one or more embodiments, the CE database (128) may be a fully managed cloud database (or any logical container) that acts as a shared storage or memory (simply storage/memory) resource (discussed below) that is functional to store unstructured and/or structured data. Further, the CE database (128) may also occupy a portion of a physical storage/memory device or, alternatively, may span across multiple physical storage/memory devices.

In one or more embodiments, the CE database (128) may store unstructured and/or structured data that may include, for example (but not limited to): an index of an asset (e.g., a file, a folder, etc.), a backup history documentation of a workload, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain backup data), recently obtained user information (e.g., records, credentials, etc.), a cumulative history of initiated data backup operations (e.g., sessions) over a prolonged period of time, a cumulative history of initiated data restore operations over a prolonged period of time, etc.

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, similar to the communication between the clients (122) and the production host (124), the clients (122) may also send a request to the CE database (128), and in return, the clients (122) may receive a response (e.g., a documentation that indicates a status of a recently initiated data backup job) from an agent (not shown) of the CE database (128). One of ordinary skill will appreciate that the CE database (128) may perform other functionalities without departing from the scope of the invention.

In one or more embodiments, the CE database (128) may provide an indexing service. More specifically, the agent of the CE database (128) may receive various data protection related inputs directly from the CE data protection modules (126) (or indirectly from the clients (122)). Upon receiving, the agent may analyze those inputs to generate an index(es) (e.g., a data backup operation index(es)) for optimizing the performance of the CE database (128) by reducing a required amount of database access(es) when implementing a request (e.g., a data retrieval request). In this manner, requested data may be quickly located and accessed from the CE database (128) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a user associated with a data protection operation (e.g., a data backup operation, a data recovery operation, etc.), a keyword extracted from a data recovery operation that relates to a type of the recovery (e.g., cloud disaster recovery, rapid recovery, etc.), a tag associated with a data protection operation (e.g., a permanent and self-service data backup from a VM), etc. The index(es) may also include other information that may be used to efficiently identify historical data protection operations. In one or more embodiments, the aforementioned data may be stored as "data protection operation metadata" in the CE database (128), in which the corresponding data may be backed up in the CE storage (temporarily or permanently), or may be restored in a recovery host.

In one or more embodiments, for example, consider a scenario in which a CE data protection module obtains file system metadata (e.g., an identifier of an asset, an identifier of a parent folder containing an asset, an attribute of an asset, an access control list (ACL) of an asset, etc.) from the CE storage. In this scenario, the CE data protection module analyzes the file system metadata and employs the indexing service of the CE database (128) to generate an index for each asset of the file system. More specifically, as a result of the analysis, the CE data protection module provides one or more components (e.g., an identifier of an asset, an attribute of an asset, etc.) of the file system metadata to the indexing service. The indexing service may then generate an index for each asset using the components.

Thereafter, the indexing service may reorder the index of each asset to reflect a file system hierarchy of the file system (because, for example, without reordering the index of each asset, the index of each asset may not accurately reflect the file system hierarchy). The CE data protection module may then display, via its GUI, the reordered index to a user of the CE data protection module. In one or more embodiments, the reordered index may also specify an access level of each asset. For example, if the reordered index shows that Folder B contains Folder D (e.g., Folder B is a parent folder of Folder D), an access level of Folder B may be four and an access level of Folder D may be five. The indexing service may store (temporarily or permanently) the reordered index in the CE database (128).

In one or more embodiments, the CE database (128) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the CE database (128) described throughout the application.

Alternatively, in one or more embodiments, similar to the CE data protection modules (126), the CE database (128) may also be implemented as a logical device.

In one or more embodiments, the CE storage may include functionality to provide: (i) temporary and/or permanent data storage services (e.g., the CE storage may store backups of the production host (124)) and (ii) copies of previously stored data (e.g., the CE storage may provide copies of previously stored backups of the production host (124)). Said another way, the CE storage may be configured to generate and store backups in itself. The CE storage may also be configured to restore data using the backups.

Further, one or more snapshots (e.g., user-generated snapshots) may be stored and/or retrieved from the CE storage. In one or more embodiments, for example, snapshots may refer to point-in-time copies of user data. For example, Snapshot A may include one or more database objects (discussed below) of user data at a specific point-in-time. As yet another example, Snapshot B may include one or more database objects of the user data at a later point-in-time than the specific point-in-time captured by Snapshot A. One of ordinary skill will appreciate that the CE storage may perform other functionalities without departing from the scope of the invention.

In one or more embodiments, the CE data protection modules (126) may obtain a status of a data protection operation from the CE storage. The status of the operation may specify information such as: (i) whether the operation was successful and whether the operation was completed within a predetermined window (e.g., 100% of the operation was completed within the predetermined window), or (ii) whether the operation was unsuccessful and how much of the operation was not completed within the predetermined window (e.g., 70% of the operation was completed and 30% of the operation was not completed). In one or more embodiments, the predetermined window may be a period of time, with a definite start and end, within which a data protection operation is set to be completed.

In one or more embodiments, the CE storage may include an operation monitoring service for monitoring a status of a data protection operation. The operation monitoring service may be a computer program that is executed on the underlying hardware of the CE storage. The operation monitoring service may also be designed and configured to facilitate remote access to check the status of and/or manipulate locally stored data during an operation. Further, the operation monitoring service may include functionality to control remote procedure calls (e.g., API calls) that aims to access and manipulate any granularity of the locally stored data during an operation.

As used herein, an "API call" refers to a process of an application or a computing device submitting a request to an API to retrieve the requested data from an external application or an external computing device.

In one or more embodiments, when an ongoing data protection operation is completed, the CE storage may send a notification (e.g., a confirmation notification) to the corresponding CE data protection module regarding the completed operation. In one or more embodiments, the notification (e.g., the alert) may indicate whether the operation was completed within the predetermined window, or whether the operation was completed after exceeding the predetermined window. The notification may be displayed on the GUI of the corresponding CE data protection module. Thereafter, the corresponding CE data protection module may notify, via a GUI of a client, a requesting entity (e.g., a user who requested the operation) about completion of the operation.

In one or more embodiments, as being a target device (or a data domain), the CE storage may include various types of data, for example (but not limited to): an attribute of an asset, an ACL of an asset, application data, user data, an SLA, a snapshot of a volume, a list of instructions, a setting of an application, a version of an application, a version of an OS, display resolution of a client, a product identifier of an application, an alert (e.g., a predictive alert, a proactive alert, a technical alert, etc.) triggered in a client, an important keyword (e.g., recommended maximum CPU operating temperature is 75° C.) related to a hardware component, an amount of storage used by an application, a language setting of an OS, a serial number of a client, a hardware ID number of a hardware component, an identifier of a client's manufacturer, a product identifier of a hardware component, media access control (MAC) information of a client, network connectivity information (e.g., a category of a network) of a client, an identifier of a client, a type of a client, a type of a file system, information related to a customer's CPU usage, a recovery catalog, an asset, a control asset, an archive log asset, etc.

In one or more embodiments, a recovery catalog may be a database object that stores metadata of a backup operation (simply "backup metadata"). The recovery catalog may include entries for one or more backup operations. The entries may include backup metadata that specify information regarding successfully backed up assets from previously executed backup operations. For example, backup metadata may include (but not limited to): an identifier of an asset, information associated with a location of an asset, etc.

In one or more embodiments, an asset may be a database object that stores database data, in which it may include a computer-readable content (e.g., text, image, video, audio, machine code, any other form of, or a combination thereof) that may be generated, interpreted, and/or processed by an application.

In one or more embodiments, an asset may store database data in an undeduplicated form or in a deduplicated form. Briefly, a deduplicated form of database data may be generated, via the application, by performing data deduplication on an undeduplicated form of the database data. That is, undeduplicated database data may include computer-readable content that may or may not entail redundant information. In contrast, deduplicated database data may result from the elimination of any redundant information analyzed throughout an undeduplicated computer-readable content.

In one or more embodiments, deduplicated database data may reflect a content recipe of one or more undeduplicated computer-readable contents. A content recipe may be a sequence of chunk identifiers (or pointers) of unique database data chunks consolidated in the CE storage. The sequence of chunk identifiers (as a representative of the deduplicated database data) may be used to reconstruct the corresponding undeduplicated database data. Additionally, a given chunk identifier for a given database data chunk may include a cryptographic fingerprint (or hash) of the given database data chunk.

In one or more embodiments, a control asset may be a database object that stores database metadata, in which the database metadata may include information descriptive of the database's status and structure. For example, database metadata may include (but not limited to): an identifier of a database, an identifier of an asset, information specifying a storage location of an asset, a creation timestamp of an asset, a log sequence number of an archive log file, etc.

In one or more embodiments, an archive log asset may be a database object that stores history of changes made to database data. An archive log asset may include one or more redo entries (or redo records), which may include a set of change vectors. Each change vector may describe (or represent) a modification made to a subset of database data. In one or more embodiments, an archive log asset may serve to recover database data should a failover occur, or to implement recent changes to recovered database data that was recovered during a backup operation.

In one or more embodiments, an alert may specify, for example (but not limited to): a medium-level of CPU overheating is detected, a recommended maximum CPU operating temperature is exceeded, etc. In one or more embodiments, alerts may be defined by a vendor of that client, by the administrator, by another entity, or any combination thereof. The alerts may be defined based on a data protection policy.

In one or more embodiments, important keywords may be defined by a vendor of that client, by the administrator, by another entity, or any combination thereof. The important keywords may be specific technical terms or vendor specific terms that are used in system log files.

In one or more embodiments, the CE storage may include one or more storage or memory resources. A storage or memory resource may refer to a measurable quantity of a storage/memory-relevant resource type, which can be requested, allocated, and consumed. A storage/memory-relevant resource type may encompass a physical device (i.e., hardware), a logical intelligence (i.e., software), or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, the production host (124) may host any number of applications (and/or content accessible through the applications) that provide application services to the clients (122). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the production host (124). In one or more embodiments, applications may be logical entities executed using computing resources of the production host (124). For example, applications may be implemented as computer instructions, e.g., computer code, stored on persistent storage of the production host (124) that when executed by the processor(s) of the production host (124) cause the production host (124) to provide the functionality of the applications described throughout the application.

In one or more embodiments, while performing, for example, one or more operations requested by a user of the clients (122), applications installed on the production host (124) may include functionality to request and use resources (e.g., data, computing resources, etc.) of the production host (124). The applications may perform other types of functionalities not listed above without departing from the scope of the invention. In one or more embodiments, while providing application services to a user, applications may store (temporarily or permanently) data that may be relevant to the user in the persistent storage or in the CE storage.

In one or more embodiments, the production host (124) may provide computer-implemented services to the clients (122) (and/or other components of the system (100)). The production host (124) may provide any quantity and any type of computer-implemented services (e.g., data storage services, electronic communication services, etc.). To provide computer-implemented services, the production host (124) may include a collection of physical components (e.g., processing resources, storage/memory resources, networking resources, etc.) configured to perform operations of the production host (124) and/or otherwise execute a collection of logical components (e.g., virtualization resources) of the production host (124). A portion of the collection of physical and logical components are described below.

In one or more embodiments, the production host (124) may include any number of VMs that hosts the above-discussed applications. The VMs may be logical entities executed using the physical and logical components of the production host (124), or using computing resources of other computing devices connected to the production host (124). Each of the VMs may perform similar or different processes. In one or more embodiments, the VMs (and applications hosted by the VMs) may generate data (e.g., VM data) that is stored in the persistent storage of the production host (124), in which the VM data may reflect a state of a VM.

In one or more embodiments, VMs may provide services (e.g., application services) to the clients (122). For example, VMs may host instances of databases, email servers, and/or other applications that are accessible to the clients (122). The VMs may host other types of components not listed above without departing from the scope of the invention.

In one or more of embodiments, VMs may be implemented as computer instructions, e.g., computer code, stored in the persistent storage that when executed by the processor(s) of the production host (124) cause the production host (124) to provide the functionality of the VMs described throughout the application.

In one or more embodiments, the production host (124) may include a hypervisor. The hypervisor may be configured to orchestrate the operation of the VMs by allocating the physical and logical components to each of the VMs. In one or more embodiments, the hypervisor may be a physical device including circuitry, for example (but not limited to): a field-programmable gate array, an application-specific integrated circuit, a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, the production host (124) may also include a production agent, which is configured to locally orchestrate the performance of data protection operations. For example, the production agent may perform a data protection operation under the direction of a CE data protection module, in which the CE data protection module sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention.

In one or more embodiments, to orchestrate the performance of one or more data operations, the production agent may issue commands to the hypervisor to manage one or more VMs when a backup of those VMs is being performed, or when a restoration of those VMs is being performed.

In one or more embodiments, the production agent may include functionality to: (i) consolidate multiple data protection requests (received from, for example the CE data protection modules (126)) so that duplicative operations (which may not be useful for restoration purposes) are not generated, and (ii) initiate multiple data protection operations in parallel. For example, the production agent may host multiple operations. Each of the multiple operations may (a) manage the initiation of a respective operation and (b) operate concurrently to initiate multiple operations. In one or more embodiments, the production agent may be implemented using hardware, software, or any combination thereof.

In one or more embodiments, the production host (124) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the production host (124) described throughout the application.

Alternatively, in one or more embodiments, similar to the CE data protection modules (126), the production host (124) may also be implemented as a logical device.

In one or more embodiments, the clients (122) may be physical or logical computing devices configured for hosting one or more workloads, or for providing a computing environment whereon workloads may be implemented. Further, the clients (122) may correspond to computing devices that a user is using to interact with one or more components of the system (100).

In one or more embodiments, a client may include any number of applications (and/or content accessible through the applications) that provide computer-implemented application services to a user. Applications may be designed and configured to perform one or more functions instantiated by a user of the clients (122). Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, the clients (122) may interact with the production host (124). For example, the clients (122) may issue requests to the production host (124) to receive responses and interact with various components of the production host (124). The clients (122) may also request data from and/or send data to the production host (124). As yet another example, the clients (122) may utilize application services provided by the production host (124). When the clients (122) interact with the production host (124), data that is relevant to the clients (122) may be stored (temporarily or permanently) in the production hosts (124).

As yet another example, consider a scenario in which the production host (124) hosts a database utilized by the clients (122). In this scenario, the database may be a client database associated with users of the clients (122). When a new user is identified, the clients (122) may add information of the new user to the client database. By doing so, data that is relevant to the clients (122) may be stored in the production host (124). This may be done because the clients (122) may desire access to the information of the new user at some point-in-time.

As yet another example, a client may execute an application that interacts with an application database hosted by the production host (124). When an application upgrade is available to fix a critical software issue, the production host (124) may identify the client that requires the application upgrade. The application database may then provide the application upgrade to the client. By doing so, the application executed by the client may be kept up-to-date. As yet another example, the clients (122) may send instructions to the production host (124) to configure one or more VMs hosted by the production host (124). In one or more embodiments, instructions may be, for example (but not limited to): instructions to configure a backup policy, instructions to take a snapshot of VM data, etc.

As yet another example, a client may initiate an application to execute on the production host (124) such that the application may (itself) gather, transmit, and/or otherwise manipulate data located in the production host (124), remote to the client. In one or more embodiments, the clients (122) may share access to more than one production host and may similarly share any data located in those hosts.

In one or more embodiments, the clients (122) may provide computer-implemented services to users (and/or other computing devices such as, for example, other clients or other types of components). The clients (122) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device, a logical intelligence, or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (122) provide computer-implemented services to users, the clients (122) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (122) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the CE data protection modules (126), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, the clients (122) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (122) described throughout the application.

Alternatively, in one or more embodiments, similar to the CE data protection modules (126), the clients (122) may also be implemented as logical devices.

In one or more embodiments, users may interact with (or operate) the clients (122) in order to perform work-related tasks (e.g., production workloads). In one or more embodiments, the accessibility of users to the clients (122) may depend on a regulation set by an administrator of the clients (122). To this end, each user may have a personalized user account that may, for example, grant access to certain data, applications, and computing resources of the clients (122). This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, as being a physical computing device or a logical computing device (e.g., a VM), the analysis server (130) may be configured for, at least: (i) hosting and maintaining various workloads and (ii) providing a computing environment (e.g., computing power and storage) whereon workloads may be implemented.

One of ordinary skill will appreciate that the analysis server (130) may perform other functionalities without departing from the scope of the invention. Examples of the analysis server (130) may include (but not limited to): an enterprise server, a modular server, a blade server, a mainframe, a workstation computer, etc. In one or more embodiments, the analysis server (130) may be a heterogeneous set, including different types of hardware components and/or different types of OSs. In one or more embodiments, the analysis server (130) may be configured to perform all, or a portion, of the functionalities described in FIGS. 3.1 and 3.2. Additional details about the analysis server are described below in reference to FIG. 2.

As used herein, a "server" may provide computer-implemented services (e.g., receiving a request, sending a response to the request, etc.) to one or more entities (e.g., users, components of the system (100), etc.). In one or more embodiments, the request may be, for example (but not limited to): a web browser search request, a REST request, a computing request, a database management request, etc. To provide the computer-implemented services to the entities, the server may perform computations locally and/or remotely. By doing so, the server may utilize different computing devices (e.g., 500, FIG. 5) that have different quantities of computing resources (e.g., processing cycles, memory, storage, etc.) to provide a consistent experience to the entities.

In one or more embodiments, the VE (110) may include, at least, the VE data protection module (112) and the VE database (114). The VE data protection module (112) and the VE database (114) may be physical or logical devices, as discussed below.

In one or more embodiments, (i) as being a part of the VE (110) and (ii) as being a physical computing device or a logical computing device, a VE data protection system (not shown, but includes at least the VE data protection module (112) and the VE database (114)) may provide less, the same, or more functionalities and/or services (described above) comparing to the CE data protection system. Similarly, (i) the VE data protection module (112) may provide less, the same, or more functionalities and/or services (described above) than a CE data protection module, and (ii) the VE database (114) may provide less, the same, or more functionalities and/or services (described above) than the CE database (128).

For example, in addition to the functionalities and/or services provided by a CE data protection module, the VE data protection module (112) may, at least: (i) act as an automated continuous integration (CI)/continuous delivery (CD) environment, (ii) act as an integration test environment (e.g., an internal test bed) so that administrators (of the VE (110)) may manage differences between the administrators' product testing activities and users' product utilization activities for product management and development, (iii) enable administrators to manage users' future data growth challenges more effectively, (iv) based on extracted insights (by the analysis server (130)), enable administrators to manage differences between the administrators' product testing activities and users' product utilization activities (performed by the users of the CE data protection modules (126)) for more pinpoint product management and development, (v) based on extracted insights, enable administrators to adopt a "shift-left" testing methodology in product management and development, (vi) based on extracted insights, enable administrators to identify a user profile of a user more in-depth in order to provide a better user experience to the user, and (vii) based on extracted insights, enable administrators to invest most of their time and engineering effort to make correct decisions with respect to product investment opportunities.

One of ordinary skill will appreciate that the VE data protection module (112) may perform other functionalities without departing from the scope of the invention. When providing its functionality, the VE data protection module (112) may perform all, or a portion, of the methods illustrated in FIG. 3.2.

In one or more embodiments, the VE data protection module (112) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the VE data protection module (112) described throughout the application.

Alternatively, in one or more embodiments, similar to the CE data protection modules (126), the VE data protection module (112) may also be implemented as a logical device.

In one or more embodiments, the VE database (114) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the VE database (114) described throughout the application.

Alternatively, in one or more embodiments, similar to the CE data protection modules (126), the VE database (114) may also be implemented as a logical device.

Figure 2:
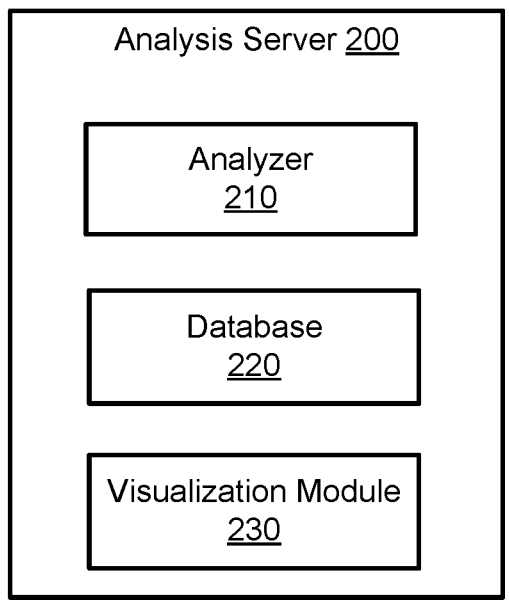
FIG. 2 shows a diagram of an analysis server in accordance with one or more embodiments of the invention.

Turning now to FIG. 2, FIG. 2 shows a diagram of an analysis server (200) in accordance with one or more embodiments of the invention. The analysis server (200) may be an example of the analysis server discussed above in reference to FIG. 1. The analysis server (200) may include an analyzer (210), a database (220), and a visualization module (230). The analysis server (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the analyzer (210) may include functionality to, e.g.: (i) obtain (or receive) client metadata (described below) associated with one or more CE data protection modules (e.g., 126, FIG. 1), (ii) obtain (or receive) vendor metadata (described below) associated with the VE data protection module (e.g., 112, FIG. 1), (iii) analyze (without the requirement of resource-intensive efforts) client metadata and vendor metadata to extract useful and detailed insights (e.g., relevant data) (described below) by employing a set of linear, non-linear, and/or machine learning (ML) models, (iv) based on the relevant data, obtain product configuration information (e.g., a type of an asset (e.g., a type of a workload), a number of each type of a set of assets, a size of each of the set of assets, a number of each type of a set of data protection policies, a type of an OS, etc.) of each module, (v) based on the relevant data, obtain one or more product features (described below) that are commonly utilized by users (e.g., product feature utilization patterns) of the CE data protection modules (e.g., 126, FIG. 1), (vi) based on the relevant data, obtain one or more product features that are tested by an administrator of the VE data protection module (e.g., 112, FIG. 1), (vii) based on the relevant data, determine any mismatch between the client metadata and vendor metadata, (viii) in response to (vii) and based on the obtained product features, generate a ranked list of commonly utilized product features (where the ranked list includes product features ordered based on their respective feature utilization levels (or values)), (ix) based on the ranked list, identify a product feature that has the highest rank in the ranked list (i.e., the most commonly utilized product feature), (x) based on (vii), determine the type (e.g., a client-related mismatch, a vendor-related mismatch, etc.) of the mismatch, (xi) based on the relevant data, identify a user profile (e.g., a profile that indicates, at least, how a CE data protection module has been utilized (by a user), for example, for centralized protection, rapid recovery, cloud tiering, self-service restore, cloud disaster recovery, etc.) of a user, (xii) based on the relevant data, identify an administrator profile (e.g., a profile that indicates, for example, how many tests have been performed on the VE data protection module (e.g., 112, FIG. 1), what type of tests have been performed on the VE data protection module (e.g., 112, FIG. 1), etc.) of an administrator, (xiii) based on the type of the mismatch and the identified product feature, send a recommendation to a user (e.g., an administrator) of the VE data protection module (e.g., 112, FIG. 1) to prevent under-testing of the identified product feature, (xiv) based on the type of the mismatch and the identified product feature, send a recommendation to an administrator of the VE data protection module (e.g., 112, FIG. 1) to prevent over-testing of the identified product feature, (xv) when necessary (and proactively), send a recommendation to an administrator of the VE data protection module (e.g., 112, FIG. 1) and/or to a user of a CE data protection module in order to internally manage differences (e.g., workload-related differences, scalability-related differences, deployment-related differences, policy configuration-related differences, asset number and/or sizing related differences, deployment environment-related differences, etc.) between how the administrators are testing/validating different aspects (e.g., reliability, scalability, user-friendliness, etc.) of the VE data protection module (e.g., 112, FIG. 1) and how the users are utilizing the CE data protection modules (e.g., 126, FIG. 1), and (xvi) store the above-discussed data and/or the output(s) of the above-discussed processes in (i)-(xv) in the database (220).

In one or more embodiments, in order to obtain client metadata and vendor metadata, the analyzer (210) may monitor the CE data protection modules (e.g., 126, FIG. 1) and VE data protection module (e.g., 112, FIG. 1). In one or more embodiments, while monitoring, the analyzer (210) may need to, for example (but not limited to): inventory one or more components of each module, obtain a type and a model of a component of a module, obtain a version of firmware or other code executing on a module, obtain information regarding a hardware component or a software component of a module, obtain information specifying each module's interaction with another component of the system (e.g., 100, FIG. 1), etc.

In one or more embodiments, if the models that are used by the analyzer (210) are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, client metadata may include (or specify), for example (but not limited to): a type of an asset (e.g., a type of a workload, such as an SQL database, a NAS executing on-premises, a VM executing on a multi-cloud infrastructure, etc.) utilized by a user, an SLA/SLO set by a user, a product identifier of a CE data protection module, an identifier of a client, a type of a client, a type of a file system, computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding the resources (e.g., product features) of a CE data protection module, one or more application logs, one or more system logs, a setting of a mission critical application executing on a CE data protection module, a version of that application, a product identifier of that application, a version of an OS, display resolution of a client, a serial number of a CE data protection module, a hardware identification number of a client, a data protection policy (e.g., an SLA, an affinity-based backup policy, a data protection policy that dictates 30 days retention at a data domain, etc.) implemented by a user (e.g., to protect a local data center, to perform a rapid recovery, etc.), a configuration setting of that policy, a product configuration information associated with a CE data protection module, a number of each type of a set of assets protected by a CE data protection module, a size of each of the set of assets protected, a number of each type of a set of data protection policies implemented by a user, a deployment configuration (e.g., a multi virtual local area network (VLAN) configuration, an IPv6 configuration, etc.) set (by a user) for a CE data protection module, a deployment environment/OS (e.g., a VMware® Cloud (VMC) environment, a Microsoft® Windows OS, a Microsoft® Hyper-V environment, etc.) set (by a user) for a CE data protection module, a job detail (e.g., how many data protection policies execute at the same time; based on a configured data protection policy, how many assets are being backed up; a type of a job, such as a data protection job, a data restoration job, a log retention job, etc.), a workflow (e.g., a policy that dictates how a workload should be configured and/or protected, such as an SQL workflow dictates how an SQL workload should be protected) set (by a user) for a CE data protection module, etc.

In one or more embodiments, a data protection policy may include (or specify), for example (but not limited to): an RPO with copies of data to be generated at a specific interval, an RTO with mission critical applications restored with low latency storage, performance requirements (e.g., latency requirements, streaming requirements, priority requirements, etc.) need to be followed while backing up data, cost associated to protect data (e.g., cloud cost versus on-premise cost), information regarding to a product feature (e.g., a centralized protection policy may be configured to protect a VM, in which the VM provides computer-implemented services to a user), etc.

Further, vendor metadata may include (or specify), for example (but not limited to): a type of a workload tested/validated by an administrator of the VE data protection module (e.g., 112, FIG. 1) per data protection policy, an SLA/SLO that is used while testing a workload on the VE data protection module, the product identifier of the VE data protection module, a predetermined maximum threshold (e.g., the best practice recommended by the vendor, such as (i) a single data protection policy should not protect more than 100 assets, (ii) for dynamic NAS, maximum one billion files can be protected per day, (iii) for FSs, maximum 1000 FSs can be protected per day via block-based backup method, etc.), a setting of a mission critical application tested on the VE data protection module, a version of that application, a product identifier of that application, a serial number of the VE data protection module, a product configuration information associated with the VE data protection module, a number of each type of a set of data protection policies tested on the VE data protection module, a configuration setting of that policy, a number of each type of a set of assets tested per policy, a size of each of the set of assets tested on the VE data protection module, a deployment configuration tested on the VE data protection module, one or more application logs, one or more system logs, a deployment environment/OS tested on the VE data protection module, a data protection policy tested on the VE data protection module, a detail of a job (e.g., how many data protection policies execute at the same time; based on a configured data protection policy, how many assets are being backed up; a type of a job, etc.) tested on the VE data protection module, a workflow tested on the VE data protection module, etc.

In one or more embodiments, the client metadata and vendor metadata may be obtained (e.g., may be dynamically fetched) as they become available (e.g., with no user manual intervention), or by the analyzer (210) polling the CE data protection modules (e.g., 126, FIG. 1) and VE data protection module (e.g., 112, FIG. 1) (by making schedule-driven/periodic API calls to them without affecting their ongoing production workloads) for new metadata. Based on receiving the API calls from the analyzer (210), the CE data protection modules (e.g., 126, FIG. 1) and VE data protection module (e.g., 112, FIG. 1) may allow the analyzer (210) to obtain the metadata.

The client metadata and vendor metadata may be obtained (or streamed) continuously as they generated, or they may be obtained in batches, for example, in scenarios where (i) the analyzer (210) receives a metadata analysis request, (ii) the CE data protection modules (e.g., 126, FIG. 1) and VE data protection module (e.g., 112, FIG. 1) accumulates the information and provides them to the analyzer (210) at fixed time intervals, or (iii) the CE data protection modules (e.g., 126, FIG. 1) and VE data protection module (e.g., 112, FIG. 1) store the information in their databases (e.g., 114, 128, FIG. 1) (or in an external entity), and notify the analyzer (210) to access the information from their storage or from the external entity. In one or more embodiments, the information may be access-protected for the transmission from the CE data protection modules (e.g., 126, FIG. 1) and VE data protection module (e.g., 112, FIG. 1) to the analyzer (210), e.g., using encryption.

In one or more embodiments, extracted relevant data may include (i) information regarding how a CE data protection module has been utilized by a user of that module and (ii) information regarding how the VE data protection module (e.g., 112, FIG. 1) has been tested/validated by an administrator of that module, for example (but not limited to): a type of a workload utilized by a user of a CE data protection module (simply "a user"), a type of a workload tested by an administrator of the VE data protection module (e.g., 112, FIG. 1) (simply "an administrator"), one or more product features (described below) that are commonly utilized by users, one or more product features that are tested by an administrator, an SLA/SLO set by a user, an SLA/SLO tested by an administrator, computing resource utilization data regarding the resources of a CE data protection module, a data protection policy implemented by a user, a data protection policy tested by an administrator, a number of each type of a set of assets protected by a CE data protection module, a number of each type of a set of assets tested by the VE data protection module, a size of each of the set of assets protected, a size of each of the set of assets tested, a number of each type of a set of data protection policies implemented by a user, a number of each type of a set of data protection policies tested by an administrator, a deployment configuration set by a user, a deployment configuration tested by an administrator, a deployment environment set by a user, a deployment environment tested by an administrator, etc.

In one or more embodiments, a product feature may be, for example (but not limited to): a centralized protection policy (e.g., a main/central server that orchestrates a data protection policy for one or more servers), a self-service protection policy (e.g., individual servers orchestrate their own data protection policies), a centralized restore policy (e.g., performing a restoration operation from a central server), a self-service restore policy (e.g., individual servers perform their own data restoration operations), a cloud tiering policy, a replication policy, a rapid recovery policy (e.g., replicating entire data (along with corresponding metadata) from a first data center to a second data center when the first data center goes off for a cause, and then bringing the first data center alive at the second data center using the aforementioned data), a disaster recovery policy (e.g., replicating data (along with computer processing) to a location not affected by a disaster (e.g., a natural disaster, a cyberattack, etc.) in order to regain access and functionality to the IT infrastructure), a cloud disaster recovery policy, etc.

One of ordinary skill will appreciate that the analyzer (210) may perform other functionalities without departing from the scope of the invention. When providing its functionality, the analyzer (210) may perform all, or a portion, of the methods illustrated in FIGS. 3.1 and 3.2. The analyzer (210) may be implemented using hardware, software, or any combination thereof.

In one or more embodiments, the database (220) may provide less, the same, or more functionalities and/or services (described above) comparing to the CE database (e.g., 128, FIG. 1). In one or more embodiments, the database (220) may be a fully managed cloud database (or any logical container) that acts as a shared storage/memory resource that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services (e.g., storing data and providing copies of previously stored data). The devices that provide data storage services may include hardware devices and/or logical devices. For example, the database (220) may include any quantity and/or combination of memory devices (i.e., volatile storage), long term storage devices (i.e., persistent storage), other types of hardware devices that may provide short-term and/or long-term data storage services, and/or logical storage devices (e.g., virtual persistent storage/virtual volatile storage).

For example, the database (220) storage may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the database (220) may store (temporarily or permanently) unstructured and/or structured data that may include, for example (but not limited to): copies of data stored in the databases (e.g., 114, 128, FIG. 1), at least a portion of client metadata, at least a portion of vendor metadata, at least a portion of relevant data, information regarding one or more product features, one or more outputs of the processes performed by the analyzer (210), etc.

In one or more embodiments, the unstructured and/or structured data may be maintained by, for example, the analyzer (210). The analyzer (210) may add, remove, and/or modify those data in the database (220) to cause the information included in the database (220) to reflect the states of the CE data protection modules (e.g., 126, FIG. 1) and VE data protection module (e.g., 112, FIG. 1). The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the invention.

While the database (220) has been described as including a limited number and type of data, the database (220) may store additional, less, and/or different data without departing from the scope of the invention.

One of ordinary skill will appreciate that the database (220) may perform other functionalities without departing from the scope of the invention. When providing its functionality, the database (220) may perform all, or a portion of, the methods illustrated in FIGS. 3.1 and 3.2. The database (220) may be implemented using hardware, software, or any combination thereof.

In one or more embodiments, the visualization module (230) may include functionality to, e.g.: (i) receive relevant data (described above) and display (e.g., to an administrator of the VE data protection module (e.g., 112, FIG. 1)) the aforementioned content on its GUI, (ii) receive a user profile (described above) of a user and an administrator profile (described above) of an administrator, and display (e.g., to the administrator) the aforementioned content on its GUI (for example, in a separate window(s) on its GUI), and (iii) receive (a) a ranked list of commonly utilized product features (including their respective feature utilization levels) and (b) an identified product feature that has the highest rank in the ranked list, and display (e.g., to the administrator) the aforementioned content on its GUI (for example, in a separate window(s) on its GUI). In one or more embodiments, the visualization module (230) may concurrently display one or more separate windows on its GUI. Further, the visualization module (230) may include functionality to generate visualizations of methods illustrated in FIGS. 3.1 and 3.2.

In one or more embodiments, while displaying the ranked list (and its corresponding details) to the administrator, each product feature may be represented with a different color, for example (but not limited to): red color tones may represent under-testing of a product feature at a test bed (e.g., the VE data protection module (e.g., 112, FIG. 1)), green color tones may represent over-testing of a product feature at the test bed, etc.

One of ordinary skill will appreciate that the visualization module (230) may perform other functionalities without departing from the scope of the invention. Although the visualization module (230) is shown as part of the analysis server (200), the visualization module (230) may also be implemented separately in the form of hardware, software, or any combination thereof.

In one or more embodiments, the analyzer (210), database (220), and visualization module (230) may be utilized in isolation and/or in combination to provide the above-discussed functionalities. These functionalities may be invoked using any communication model including, for example, message passing, state sharing, memory sharing, etc. By doing so, the analysis server (200) may address issues related to data protection modules proactively.

FIGS. 3.1 and 3.2 show a method for identifying one or more product features based on metadata in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed analyzer (e.g., 210, FIG. 2). Other components of the system (100) illustrated in FIG. 1 may also execute all or part of the method shown in FIG. 3.1 without departing from the scope of the invention.

In Step 300, the analyzer monitors the performance of one or more CE data protection modules (e.g., 126, FIG. 1) by obtaining (e.g., gathering) telemetry data (e.g., the source of truth) associated with each CE data protection module. In order to monitor, for example, the analyzer obtains client metadata associated with each CE data protection module. In one or more embodiments, the obtained client metadata may specify, for example (but not limited to): a type of a workload utilized by a user, an SLA/SLO set by a user, computing resource utilization data regarding the resources of a CE data protection module, a data protection policy implemented by a user, a configuration setting of that policy, a deployment configuration set (by a user) for a CE data protection module, etc. Additional details of the client metadata and client metadata gathering operation are described above in reference to FIG. 2.

In one or more embodiments, in addition to the client metadata, the analyzer may also obtain one or more alerts that are triggered at a corresponding CE data protection module. For example, based on a failed cloud disaster recovery operation (which is initiated by a user), the corresponding CE data protection module may generate a failure alert. Thereafter, the analyzer may store (temporarily or permanently) those alerts in the database (e.g., 220, FIG. 2). In this manner, the analyzer may obtain more information regarding, e.g., (i) the operations performed and/or failures occurred in the corresponding CE data protection module, and (ii) one or more reasons of those failures (e.g., is it because the production host (e.g., 124, FIG. 1) not accessible, is it because the CE database not accessible, etc.).

In one or more embodiments, alerts may be defined by a vendor of the corresponding CE data protection module, by an administrator, by another entity, or any combination thereof. The alerts may be defined based on a data protection policy.

In Step 302, similar to Step 300, the analyzer monitors the performance of the VE data protection module (e.g., 112, FIG. 1) by obtaining telemetry data associated with the VE data protection module. In order to monitor, for example, the analyzer obtains vendor metadata associated with the VE data protection module. In one or more embodiments, the obtained vendor metadata may specify, for example (but not limited to): a type of a workload tested/validated by an administrator of the VE data protection module per data protection policy, an SLA/SLO that is used while testing a workload, a recommended resource utilization value by a vendor, a number of each type of a set of data protection policies tested on the VE data protection module, a configuration setting of that policy, a deployment environment/OS tested on the VE data protection module, etc. Additional details of the vendor metadata and vendor metadata gathering operation are described above in reference to FIG. 2.

In one or more embodiments, before analyzing (in Step 304) the obtained client metadata (in Step 300) and vendor metadata, the analyzer stores (temporarily or permanently) them in the database.

In Step 304, by employing a set of linear, non-linear, and/or ML models (e.g., the k-nearest neighbors model), the analyzer proactively analyzes the obtained client metadata (in Step 300), vendor metadata (in Step 302), and alerts (in Step 300) to extract relevant data. In one or more embodiments, based on the extracted data, the analyzer may, for example (but not limited to): infer the type of data protection operations, workloads, data protection polices, etc. orchestrated by one or more CE data protection modules and the VE data protection module, obtain information regarding how a CE data protection module has been utilized by a user of that module, obtain information regarding how the VE data protection module has been tested/validated by an administrator of that module, infer what type of fixes need to be implemented at the VE data protection module for a better product management and development, derive one or more outputs (described below) with respect to usage of a CE data protection module to make a better investment decision for long-term product development (rather than second-guessing), infer a workload-related mismatch (e.g., internal workload test coverage matches to 50% of workload coverage implemented by User 2) between how an administrator is testing different aspects of the VE data protection module and how a user is utilizing a CE data protection module, infer a scalability-related mismatch (e.g., there is no data protection configuration such as "protection rules", but User 4 has configured 8 of such rules) between how an administrator is testing different aspects of the VE data protection module and how a user is utilizing a CE data protection module, infer one or more product feature utilization differences (with respect to, for example, type and quantity) between the product features implemented on the VE data protection module and on the CE data protection modules, infer whether or not a user is satisfied with, at least, the performance, reliability, scalability, etc. of a CE data protection module provided to the user, etc. Details of the extracted data are described above in reference to FIG. 2.

In one or more embodiments, the derived outputs may specify, for example (but not limited to): Product Feature A (e.g., a centralized protection policy) is used by Users 1-4 extensively; on average, last month, Product Feature B (e.g., an SQL database) is utilized by 50% of the users; last week between time 1 and time 2, one of the CPUs of CE data protection module X has exceeded recommended maximum CPU operating temperature because of a fan failure; etc.

In one or more embodiments, in order to compare and evaluate the obtained client metadata and vendor metadata (and in order to extract "intelligent" insights from both metadata), the analyzer may implement the k-nearest neighbors model. For example, consider a scenario where a test bed and three CE data protection modules (e.g., CE data protection module A provided to User 1, CE data protection module B provided to User 2, and CE data protection module C provided to User 3) exist in the VE (e.g., 110, FIG. 1) and CE (e.g., 120, FIG. 1), respectively. In this scenario, (a) product features (and information related to those product features) implemented (or tested) on the test bed are: (i) a centralized protection policy (quantity of protected assets: 20), (ii) a centralized restore policy (quantity of restored assets:40), (iii) a cloud tiering policy (quantity of tiered assets:15), and (iv) a cloud disaster recovery policy (quantity of recovered assets:10); (b) product features (and information related to those product features) implemented on CE data protection module A are: (i) centralized protection policy A (quantity of protected assets:45), (ii) centralized restore policy A (quantity of restored assets:45), and (iii) cloud tiering policy A (quantity of tiered assets:10); (c) product features (and information related to those product features) implemented on CE data protection module B are: (i) centralized protection policy B (quantity of protected assets:35), (ii) cloud disaster recovery policy B (quantity of recovered assets:15), and (iii) cloud restore policy B (quantity of restored assets:10); and (d) product features (and information related to those product features) implemented on CE data protection module C are: (i) centralized protection policy C (quantity of protected assets:40), (ii) cloud tiering policy C (quantity of tiered assets:25), and (iii) cloud disaster recovery policy C (quantity of recovered assets:10).

Thereafter, by implementing the k-nearest neighbors model, the analyzer determines that: (i) "centralized protection" policy is tested (with 20 assets in total) on the test bed, and is utilized on CE data protection module A (with 45 assets in total), CE data protection module B (with 35 assets in total), and CE data protection module C (with 40 assets in total); (ii) "centralized restore" policy is tested (with 40 assets in total) on the test bed, and is utilized on CE data protection module A (with 45 assets in total) and CE data protection module B (with 10 assets in total); (iii) "cloud tiering" policy is tested (with 15 assets in total) on the test bed, and is utilized on CE data protection module A (with 10 assets in total) and CE data protection module C (with 25 assets in total); and (iv) "cloud disaster recovery" policy is tested (with 10 assets in total) on the test bed, and is utilized on CE data protection module B (with 15 assets in total) and CE data protection module C (with 10 assets in total).

In the above scenario, based on the extracted insights from both metadata, the analyzer also determines that: (i) there is only one test bed deployed to the VE (e.g., 110, FIG. 1) and there are three CE data protection modules (e.g., A-C) deployed to the CE (e.g., 120, FIG. 1), which are utilized by three different users (e.g., Users 1-3), (ii) the administrator has tested the "centralized protection policy", "centralized restore policy", "cloud tiering policy", and "cloud disaster recovery policy" features on the test bed, (iii) 100% of the users (i.e., Users 1-3) are utilizing the "centralized protection policy" feature, (iv) 66.7% of the users (i.e., Users 1 and 2) are utilizing the "centralized restore policy" feature, (v) 66.7% of the users (i.e., Users 2 and 3) are utilizing the "cloud disaster recovery policy" feature, and (vi) 66.7% of the users (i.e., Users 1 and 3) are utilizing the "cloud tiering policy" feature.

Based on the aforementioned product feature utilization data, the analyzer may generate histograms (rather than just averaging the product feature utilization data received via client metadata) to generate (and send) one or more recommendations associated with proactive actions.

In one or more embodiments, based on histograms, if the analyzer determines that there are one or more users (e.g., outliers) that are leveraging against the best practice recommended by the administrator (e.g., User 5 is protecting 10 billion Dynamic NAS assets, even though the best practice recommended specifies "a single policy should not exceed 5 billion Dynamic NAS assets"), the analyzer may, at least: (i) recommend increasing the predetermined maximum product feature utilization level (or modifying the recommended best practice) of that particular product feature in the next releases of the data protection module, and (ii) generate and send one or more recommendations to the corresponding user (e.g., User 5) in order to handle the situation and engage with that user. More specifically, for (ii), the analyzer may take one or more preventive (and proactive) actions, in which the analyzer may send a recommendation (or multiple recommendations with minimum amount of latency) to the outlier user of the corresponding CE data protection module to, at least: (i) modify that particular product feature's utilization level (or the outlier user's utilization pattern), and (ii) engage with the outlier user and provide a better user experience.

In one or more embodiments, the analyzer may then display the aforementioned content, via the visualization module (e.g., 230, FIG. 2), to an administrator of the VE data protection module. The analyzer may also store (temporarily or permanently) the aforementioned content in the database.

In Step 306, based on the relevant data (extracted in Step 304), the analyzer obtains one or more product features that are commonly utilized by users of the CE data protection modules. With respect to the example discussed above in reference to Step 304, the analyzer may obtain the "centralized protection policy" feature (100% of the users (i.e., User 1-3) are utilizing this product feature), "centralized restore policy" feature (66.7% of the users (i.e., Users 1 and 2) are utilizing this product feature), "cloud disaster recovery policy" feature (66.7% of the users (i.e., Users 2 and 3) are utilizing this product feature), and "cloud tiering policy" feature (66.7% of the users (i.e., Users 1 and 3) are utilizing this product feature) as commonly utilized product features among the users. The analyzer may then store (temporarily or permanently) the aforementioned content in the database.

In Step 308, based on the extracted relevant data (in Step 304), a first determination is made as to whether there is mismatch between the client metadata (obtained in Step 300) and vendor metadata (obtained in Step 302). Accordingly, in one or more embodiments, if the result of the determination is YES, the method proceeds to Step 310. If the result of the determination is NO, the method alternatively ends.

In Step 310, as a result of the first determination in Step 308 being YES, the analyzer generates a ranked list of commonly utilized product features, in which the ranked list includes at least the product features ordered based on their respective feature utilization levels. With respect to the example discussed above in reference to Step 304, the analyzer may generate the ranked list as: (ranked at the first place) the "centralized protection policy" feature, (ranked at the second place) the "centralized restore policy" feature (because of its respective feature utilization level among Users 1 and 2, which is 55), (ranked at the third place) the "cloud tiering policy" feature (because of its respective feature utilization level among Users 1 and 3, which is 35), and (ranked at the fourth place) the "cloud disaster recovery policy" feature (because of its respective feature utilization level among Users 2 and 3, which is 25).

Turning now to FIG. 3.2, the method shown in FIG. 3.2 may be executed by, for example, the above-discussed analyzer. Other components of the system (100) illustrated in FIG. 1 may also execute all or part of the method shown in FIG. 3.2 without departing from the scope of the invention.

In Step 312, based on the ranked list (generated in Step 310 of FIG. 3.1), the analyzer identifies a product feature that has the highest rank in the ranked list. With respect to the example discussed above in reference to Step 310 of FIG. 3.1, the analyzer identifies the "centralized protection policy" feature as the product feature that has the highest rank in the ranked list (i.e., the most commonly utilized product feature among Users 1-3).

In one or more embodiments, the analyzer may then display (a) the ranked list (including their respective feature utilization levels) and (b) the identified product feature via the visualization module (e.g., 230, FIG. 2). The analyzer may also store (temporarily or permanently) the aforementioned content in the database.

In Step 314, in response to identifying the highest ranked product feature (in Step 312) and as a result of the first determination in Step 308 of FIG. 3.1 being YES, a second determination is made as to whether the mismatch is a vendor-related mismatch. Accordingly, in one or more embodiments, if the result of the determination is YES, the method proceeds to Step 316. If the result of the determination is NO, the method alternatively proceeds to Step 318.

In one or more embodiments, based on the relevant data and first determination, the analyzer employs a set of linear, non-linear, and/or ML models (e.g., may employ a set difference model) to determine one or more similarities and/or differences between, for example, the VE data protection module (simply "T") and CE data protection modules (simply "A" (provided to User 1) and "B" (provided to User 2)) with respect to the identified product feature. For example, consider a scenario where information related to the identified product feature (e.g., the "centralized protection policy" feature) are: (a) at T: (i) asset source (e.g., a type of an asset): an SQL database, (ii) number of protected assets using the centralized protection policy:20, and (iii) average asset size of an asset: 5 GB; (b) at A: (i) asset source: an SQL database, (ii) number of protected assets using the centralized protection policy:35, and (iii) average asset size of an asset: 5 GB; and (c) at B: (i) asset source: an SQL database, (ii) number of protected assets using the centralized protection policy:45, and (iii) average asset size of an asset: 5 GB.

In this scenario, by implementing the set difference model, the analyzer determines that (i) there is a "scale-related and vendor-related" mismatch between T, A, and B because of the number of protected assets in each module (e.g., due to under-testing of the protected asset (where the set difference between T and B is −25 ("T-B"="number of protected assets:20" and "B-T"="number of protected assets:45")).

In one or more embodiments, in the set difference model, the following steps may be implemented (e.g., for the case of T and B): (i) check "T-B" !="B-T", (ii) check "T-B"<"B-T" (if this is the case and if B is in line with the best practice recommended by the administrator of T, analyzer determines that there is a vendor-related mismatch and because of that, a recommendation to prevent under-testing should be sent to the administrator of T), (iii) check "T-B">"B-T" (if this is the case, analyzer determines that there is a client-related mismatch and because of that, a recommendation to prevent over-testing should be sent to the administrator of T), and (iv) check "T-B"="B-T" (if this is the case, analyzer determines that the data protection module is tested properly by the administrator of T and used properly by User 2).

In one or more embodiments, the analyzer may then display the aforementioned content, via the visualization module, to the administrator of the VE data protection module. The analyzer may also store (temporarily or permanently) the aforementioned content in the database.

In Step 316, as a result of the second determination in Step 314 being YES, the analyzer may take one or more preventive (and proactive) actions. In this manner, in one or more embodiments, the analyzer may send a recommendation (e.g., a request, a command, etc.) (or multiple recommendations with minimum amount of latency) to the administrator of the VE data protection module to, e.g.: (i) prevent (e.g., to manage) under-testing of the identified product feature (in Step 312), (ii) develop and provide a better data protection module (with respect to functionality, scalability, reliability, etc.), and (iii) provide a better user experience.

In one or more embodiments, the administrator of the VE data protection module may receive, via a GUI of the VE data protection module or the GUI of the visualization module, the recommendation (e.g., please increase the number of tested assets with respect to the product feature) as pre-loaded instructions (present in the database) and/or via other methods. Further, the analyzer may include a recommendation monitoring service to monitor whether the provided recommendation is implemented by the administrator of the VE data protection module. The recommendation monitoring service may be a computer program that may be executed on the underlying hardware of the analyzer. The recommendation monitoring service may be designed and configured to facilitate remote access to check whether under-testing of the identified product feature is prevented. Based on monitoring, if under-testing of the identified product feature could not resolved even after implementing the provided recommendation, the analyzer may provide a second recommendation to the administrator.

In one or more embodiments, the analyzer may then store (temporarily or permanently) the recommendation in the database.

In one or more embodiments, the method may end following Step 316.

In Step 318, as a result of the second determination in Step 314 being NO, the analyzer may take one or more preventive (and proactive) actions. In this manner, in one or more embodiments, the analyzer may send a recommendation (or multiple recommendations with minimum amount of latency) to the administrator of the VE data protection module to, e.g.: (i) prevent over-testing of the identified product feature (in Step 312), (ii) develop and provide a better data protection module (with respect to functionality, scalability, reliability, etc.), and (iii) provide a better user experience.

In one or more embodiments, the administrator of the VE data protection module may receive, via the GUI of the VE data protection module or the GUI of the visualization module, the recommendation (e.g., please decrease the number of tested assets with respect to the product feature) as pre-loaded instructions (present in the database) and/or via other methods. Further, via the recommendation monitoring service, the analyzer may monitor whether the provided recommendation is implemented by the administrator of the VE data protection module. The recommendation monitoring service may be designed and configured to facilitate remote access to check whether over-testing of the identified product feature is prevented. Based on monitoring, if over-testing of the identified product feature could not resolved even after implementing the provided second recommendation, the analyzer may provide a second recommendation to the administrator.

In one or more embodiments, the analyzer may then store (temporarily or permanently) the second recommendation in the database.

In one or more embodiments, the method may end following Step 318.

Start of Example

The following section describes an example of one or more embodiments. The example, illustrated in FIGS. 4.1-4.4, is not intended to limit the scope of the embodiments disclosed herein and is independent from any other examples discussed in this application.

Turning to the example, consider a use case in which (i) an example VE includes an example VE data protection module (400), and (ii) an example CE includes (a) an example CE data protection module A (402), (b) an example CE data protection module B (404), (c) an example CE data protection module C (406), and (d) an example CE data protection module D (408). Initially, FIG. 4.1 shows diagrams of the example VE data protection module (400) and example CE data protection modules (402, 404, 406, and 408). For the sake of brevity, not all components of the example VE data protection module (400) and example CE data protection modules (402, 404, 406, and 408) may be illustrated in FIG. 4.1.

Assume here that, by implementing the k-nearest neighbors model, the analyzer determines that: (i) (a) "centralized protection policy" is tested (with 20 assets in total) on the example VE data protection module (400), (b) "centralized restore policy" is tested (with 40 assets in total) on the example VE data protection module (400), (c) "cloud tiering policy" is tested (with 15 assets in total) on the example VE data protection module (400), and (d) "cloud disaster recovery policy" is tested (with 10 assets in total) on the example VE data protection module (400); (ii) (a) "centralized protection policy A" is utilized (with 35 assets in total) on the example CE data protection module A (402), (b) "centralized restore policy A" is utilized (with 40 assets in total) on the example CE data protection module A (402), (c) "cloud tiering policy A" is utilized (with 5 assets in total) on the example CE data protection module A (402), and (d) "cloud disaster recovery policy A" is utilized (with 15 assets in total) on the example CE data protection module A (402); (iii) (a) "centralized protection policy B" is utilized (with 45 assets in total) on the example CE data protection module B (404) and (b) "centralized restore policy B" is utilized (with 45 assets in total) on the example CE data protection module B (402); (iv) (a) "centralized protection policy C" is utilized (with 35 assets in total) on the example CE data protection module C (406) and (b) "cloud disaster recovery policy C" is utilized (with 15 assets in total) on the example CE data protection module C (406); and (v) (a) "centralized protection policy D" is utilized (with 30 assets in total) on the example CE data protection module D (408), (b) "centralized restore policy D" is utilized (with 30 assets in total) on the example CE data protection module D (408), and (c) "cloud tiering policy D" is utilized (with 5 assets in total) on the example CE data protection module D (408).

Based on the aforementioned content, the analyzer infers that there is only one example VE data protection module (400) deployed to the VE, and "centralized protection", "centralized restore", "cloud tiering", and "cloud disaster recovery" policies are tested on the example VE data protection module (400).

Turning now to FIG. 4.2, FIG. 4.2 shows a diagram of the example CE data protection modules (402, 404, 406, and 408). Based on the aforementioned content, the analyzer also infers that there are four example CE data protection modules (402, 404, 406, and 408) deployed to the CE, in which (i) a "centralized protection policy" is utilized by User A (i.e., the user of CE data protection module A (402)), User B (i.e., the user of CE data protection module B (404)), User C (i.e., the user of CE data protection module C (406)), and User D (i.e., the user of CE data protection module D (408)); (ii) a "centralized restore policy" is utilized by User A, User B, and User D; (iii) a "cloud tiering policy" is utilized by User A and User D; and (iv) a "cloud disaster recovery policy" is utilized by User A and User C.

Thereafter, based on the aforementioned product feature utilization data, the analyzer generates a ranked list of commonly utilized product features. The analyzer may generate the ranked list as: (ranked at the first place) the "centralized protection policy" feature, (ranked at the second place) the "centralized restore policy" feature, (ranked at the third place) the "cloud disaster recovery policy" feature (because of its respective feature utilization level by Users A and C, which is 30), and (ranked at the fourth place) the "cloud tiering policy" feature (because of its respective feature utilization level by Users A and D, which is 10). Further, based on the ranked list, the analyzer identifies the "centralized protection policy" as the most commonly utilized product feature among Users A-D.

Turning now to FIG. 4.3, FIG. 4.3 shows diagrams of the example VE data protection module (400) and example CE data protection modules (402, 404, 406, and 408) at a later point-in-time. Based on the aforementioned content in reference to FIGS. 4.1 and 4.2, the analyzer determines that: (i) there is a vendor-related mismatch between client metadata and vendor metadata (with respect to "centralized protection policy" product feature) because the users of the example CE data protection modules (402, 404, 406, and 408) are each protecting more assets (which is in line with the best practice (e.g., "a single policy should not exceed 100 assets") recommended by the vendor) than the number of protected assets tested by the administrator (e.g., by the vendor) of the example VE data protection module (400), and (ii) the administrator is under-testing and based on (i), the administrator should test more assets (at least 45 assets) in order to prevent under-testing and provide a better user experience (see FIG. 4.4).

Following the determinations made by the analyzer, the analyzer sends a recommendation to the administrator (specifically to prevent under-testing and provide a better user experience).

Turning now to FIG. 4.4, FIG. 4.4 shows a diagram of the example VE data protection module (400) at a later point-in-time. In response to the recommendation (sent by the analyzer), the administrator performs the required modifications (specified in the recommendation) on the example VE data protection module (400). Thereafter, the analyzer identifies that (after the modifications): (i) the number of protected assets (tested by the administrator) under the "centralized protection policy" product feature is increased (20→90, underlined), (ii) under-testing of the most commonly utilized product feature is prevented, and (iii) a better user experience is provided.

END OF EXAMPLE

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data protection module, the method comprising:
   obtaining client metadata associated with a plurality of client environment (CE) data protection modules, wherein the client metadata comprises at least first product configuration information;
   obtaining vendor metadata associated with a vendor environment (VE) data protection module, wherein the vendor metadata comprises at least second product configuration information;
   analyzing the client metadata and the vendor metadata to extract relevant data;
   obtaining, based on the relevant data, a plurality of product features that are commonly utilized by at least one user of the plurality of CE data protection modules;
   making, based on the relevant data, a first determination that a mismatch exists between the client metadata and the vendor metadata;
   generating, in response to the first determination, a ranked list of the plurality of product features that are commonly utilized, wherein the ranked list comprises product features ordered based on their respective feature utilization levels;
   identifying, based on the ranked list, a product feature that has the highest rank in the ranked list;
   making, based on the first determination, a second determination that the mismatch is a vendor-related mismatch; and
   sending, based on the second determination, a recommendation to a user of the VE data protection module to manage the vendor-related mismatch.

2. The method of claim 1, wherein the product feature is a cloud disaster recovery policy, wherein the cloud disaster recovery policy is configured to recover a network-attached storage device that is utilized by the at least one user.

3. The method of claim 1, wherein the product feature is a centralized protection policy, wherein the centralized protection policy is configured to protect a virtual machine, wherein the virtual machine provides at least one computer-implemented service to the at least one user.

4. The method of claim 1, wherein the first product configuration information specifies at least one selected from a group consisting of a type of each of a plurality of assets, a number of each type of the plurality of assets, a size of each of the plurality of assets, a type of an operating system, and a number of each type of a plurality of data protection policies, wherein the plurality of data protection policies comprises at least the product feature, wherein the product feature is a cloud disaster recovery policy.

5. The method of claim 1, wherein the second product configuration information specifies at least one selected from a group consisting of a type of each of a plurality of assets, a number of each type of the plurality of assets, a size of each of the plurality of assets, a type of an operating system, and a number of each type of a plurality of data protection policies, wherein the plurality of data protection policies comprises at least the product feature, wherein the product feature is a centralized protection policy.

6. The method of claim 1, wherein the feature utilization level of the product feature specifies at least a number of a plurality of users that utilizes the product feature, wherein the plurality of users comprises the at least one user.

7. The method of claim 1, wherein the relevant data specifies at least a number of each type of a plurality of assets and a size of each of the plurality of assets.

8. The method of claim 1, wherein the vendor-related mismatch specifies that the VE data protection module is under-testing with respect to the product feature.

9. The method of claim 1, wherein the recommendation specifies an increase in a number of a plurality of tested assets with respect to the product feature on a testbed.

10. A method for managing a data protection module, the method comprising:
    obtaining client metadata associated with a plurality of client environment (CE) data protection modules, wherein the client metadata comprises at least first product configuration information;
    obtaining vendor metadata associated with a vendor environment (VE) data protection module, wherein the vendor metadata comprises at least second product configuration information;
    analyzing the client metadata and the vendor metadata to extract relevant data;
    obtaining, based on the relevant data, a plurality of product features that are commonly utilized by at least one user of the plurality of CE data protection modules;
    making, based on the relevant data, a first determination that a mismatch exists between the client metadata and the vendor metadata;
    generating, in response to the first determination, a ranked list of the plurality of product features that are commonly utilized, wherein the ranked list comprises product features ordered based on their respective feature utilization levels;
    identifying, based on the ranked list, a product feature that has the highest rank in the ranked list;
    making, based on the first determination, a second determination that the mismatch is a client-related mismatch; and
    sending, based on the second determination, a recommendation to a user of the VE data protection module to manage the client-related mismatch.

11. The method of claim 10, wherein the product feature is a cloud disaster recovery policy, wherein the cloud disaster recovery policy is configured to recover a network-attached storage device that is utilized by the at least one user.

12. The method of claim 10, wherein the product feature is a centralized protection policy, wherein the centralized protection policy is configured to protect a virtual machine, wherein the virtual machine provides at least one computer-implemented service to the at least one user.

13. The method of claim 10, wherein the first product configuration information specifies at least one selected from a group consisting of a type of each of a plurality of assets, a number of each type of the plurality of assets, a size of each of the plurality of assets, a type of an operating system, and a number of each type of a plurality of data protection policies, wherein the plurality of data protection policies comprises at least the product feature, wherein the product feature is a cloud disaster recovery policy.

14. The method of claim 10, wherein the second product configuration information specifies at least one selected from a group consisting of a type of each of a plurality of assets, a number of each type of the plurality of assets, a size of each of the plurality of assets, a type of an operating system, and a number of each type of a plurality of data protection policies, wherein the plurality of data protection policies comprises at least the product feature, wherein the product feature is a centralized protection policy.

15. The method of claim 10, wherein the feature utilization level of the product feature specifies at least a number of a plurality of users that utilizes the product feature, wherein the plurality of users comprises the at least one user.

16. The method of claim 10, wherein the relevant data specifies at least a number of each type of a plurality of assets and a size of each of the plurality of assets.

17. The method of claim 10, wherein the client-related mismatch specifies that the VE data protection module is over-testing with respect to the product feature.

18. A system for managing a data protection module, the system comprising:
   a processor comprising circuitry;
   memory comprising instructions, which when executed perform a method, the method comprising:
      obtaining client metadata associated with a plurality of client environment (CE) data protection modules, wherein the client metadata comprises at least first product configuration information;
      obtaining vendor metadata associated with a vendor environment (VE) data protection module, wherein the vendor metadata comprises at least second product configuration information;
      analyzing the client metadata and the vendor metadata to extract relevant data;
      obtaining, based on the relevant data, a plurality of product features that are commonly utilized by at least a user of the plurality of CE data protection modules;
      making, based on the relevant data, a determination that a mismatch exists between the client metadata and the vendor metadata;
      generating, in response to the determination, a ranked list of the plurality of product features that are commonly utilized, wherein the ranked list comprises product features ordered based on their respective feature utilization levels;
      identifying, based on the ranked list, a product feature that has the highest rank in the ranked list; and
      sending, based on the identification, a recommendation to manage the mismatch to at least one of a user of the VE data protection module and the user of the CE data protection modules.

19. The system of claim 18, wherein the mismatch is a vendor-related mismatch.

20. The system of claim 18, wherein the mismatch is a client-related mismatch.

* * * * *